United States Patent
Scharland et al.

(10) Patent No.: US 11,442,860 B2
(45) Date of Patent: Sep. 13, 2022

(54) HOST CACHE COHERENCY WHEN READING DATA

(71) Applicant: EMC IP Holding Company LLC, Hopkinton, MA (US)

(72) Inventors: Michael J. Scharland, Franklin, MA (US); Ian Wigmore, Westborough, MA (US); Arieh Don, Newton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 29 days.

(21) Appl. No.: 16/530,111

(22) Filed: Aug. 2, 2019

(65) Prior Publication Data

US 2021/0034519 A1    Feb. 4, 2021

(51) Int. Cl.
*G06F 12/084*    (2016.01)

(52) U.S. Cl.
CPC .... *G06F 12/084* (2013.01); *G06F 2212/1021* (2013.01); *G06F 2212/608* (2013.01)

(58) Field of Classification Search
CPC .......... G06F 12/084; G06F 2212/1021; G06F 2212/608
See application file for complete search history.

(56) References Cited

U.S. PATENT DOCUMENTS

| | | | |
|---|---|---|---|
| 4,530,054 A | 7/1985 | Hamstra et al. | |
| 5,717,897 A | 2/1998 | McCrory | |
| 6,513,097 B1 | 1/2003 | Beardsley et al. | |
| 8,904,050 B1 | 12/2014 | Raizen et al. | |
| 9,495,292 B1 | 11/2016 | Shain et al. | |
| 2011/0265083 A1* | 10/2011 | Davis | G06F 12/0866 718/1 |
| 2012/0284231 A1* | 11/2012 | Basescu | G06F 16/1873 707/638 |
| 2014/0059298 A1 | 2/2014 | Olin et al. | |
| 2014/0059300 A1 | 2/2014 | Olin et al. | |
| 2015/0169497 A1* | 6/2015 | Fried | G06F 12/0831 709/214 |
| 2016/0212198 A1 | 7/2016 | Krishnasamy et al. | |
| 2018/0349408 A1* | 12/2018 | Jewell | G06F 16/1734 |

(Continued)

OTHER PUBLICATIONS

U.S. Appl. No. 16/530,089, filed Aug. 2, 2019, Scharland, et al.

(Continued)

*Primary Examiner* — David Yi
*Assistant Examiner* — Alan Otto
(74) *Attorney, Agent, or Firm* — Muirhead and Saturnelli, LLC

(57) ABSTRACT

When a read request for the data portion is received from an application executing on a host, the host may determine whether the data portion is in host cache, and if so, whether the logical storage unit of the data portion is shared by another host system. If there is another host system sharing the logical storage unit, a latest version stored on the storage system may be determined and compared to the version stored in the host cache. If the version in the host cache is the same as the latest version stored on the storage system, the data portion may be retrieved from the host cache. If the version in the host cache is not the latest version stored on the storage system, the data portion may be retrieved from the storage system, and the host cache may be updated with the latest version of the data portion.

21 Claims, 10 Drawing Sheets

(56) References Cited

U.S. PATENT DOCUMENTS

2019/0042388 A1\* 2/2019 Wang .................. G06F 13/4282
2020/0081629 A1 3/2020 Brown et al.

OTHER PUBLICATIONS

U.S. Appl. No. 16/389,383, filed Apr. 19, 2019, Wigmore, et al.
Van Moolenbroek, D.C., Appuswany, R., and A.S. Tanenbaum, "Integrated System and Process Crash Recovery in the Loris Storage Stack," IEEE Seventh International Conference of Networking, Architecture and Storage, 2012.
Appuswamy, R., van Moolenbroek, D.C., Santhanam, S. and A.S. Tanenbaum. "File-level, Host-side Flash Caching with Loris," Proc. of the 19th IEEE International Conference on Parallel and Distributed Systems, 2013.
Byan, S., Lentini, J., Madan, A. and L. Pabon, "Mercury: Host-side Flash Caching for the Data Center," Proceedings of 28th IEEE Conference on Mass Storage Systems and Technologies, 2012.

\* cited by examiner

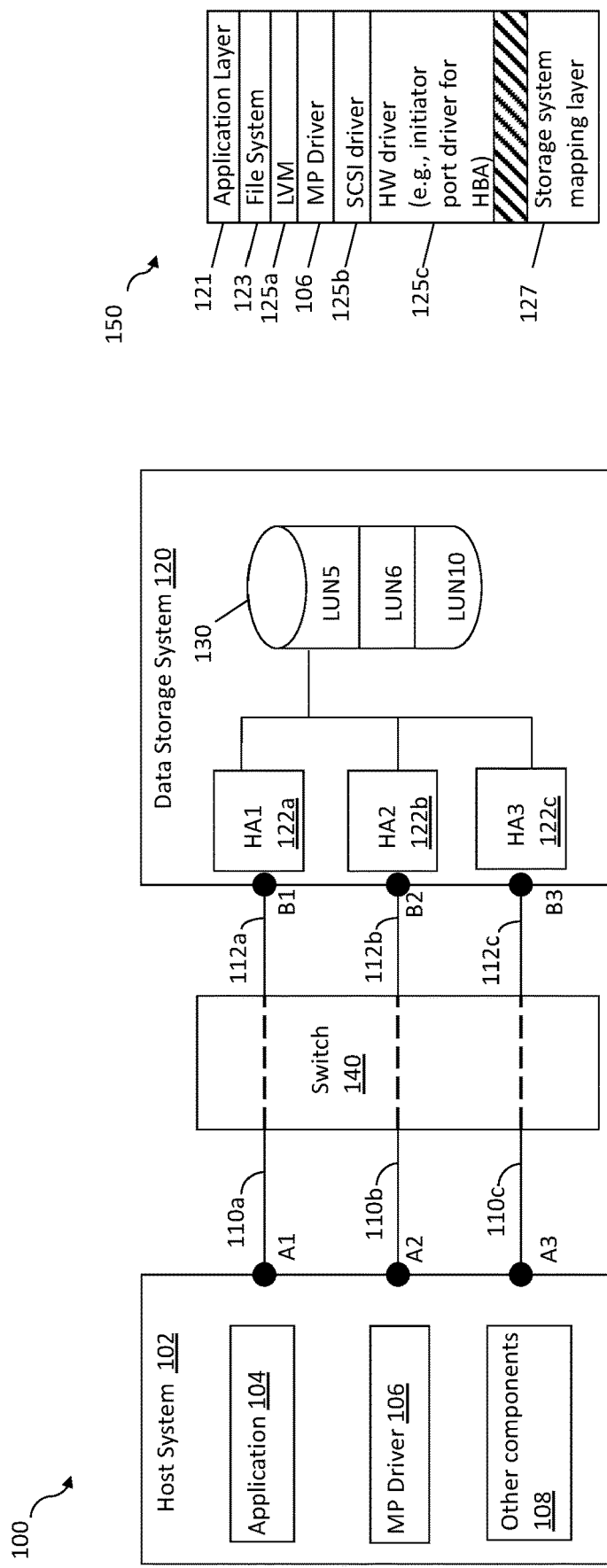

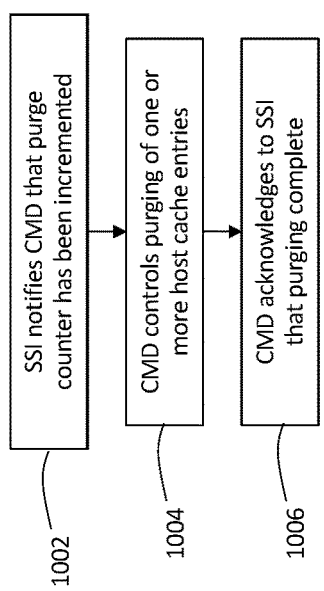
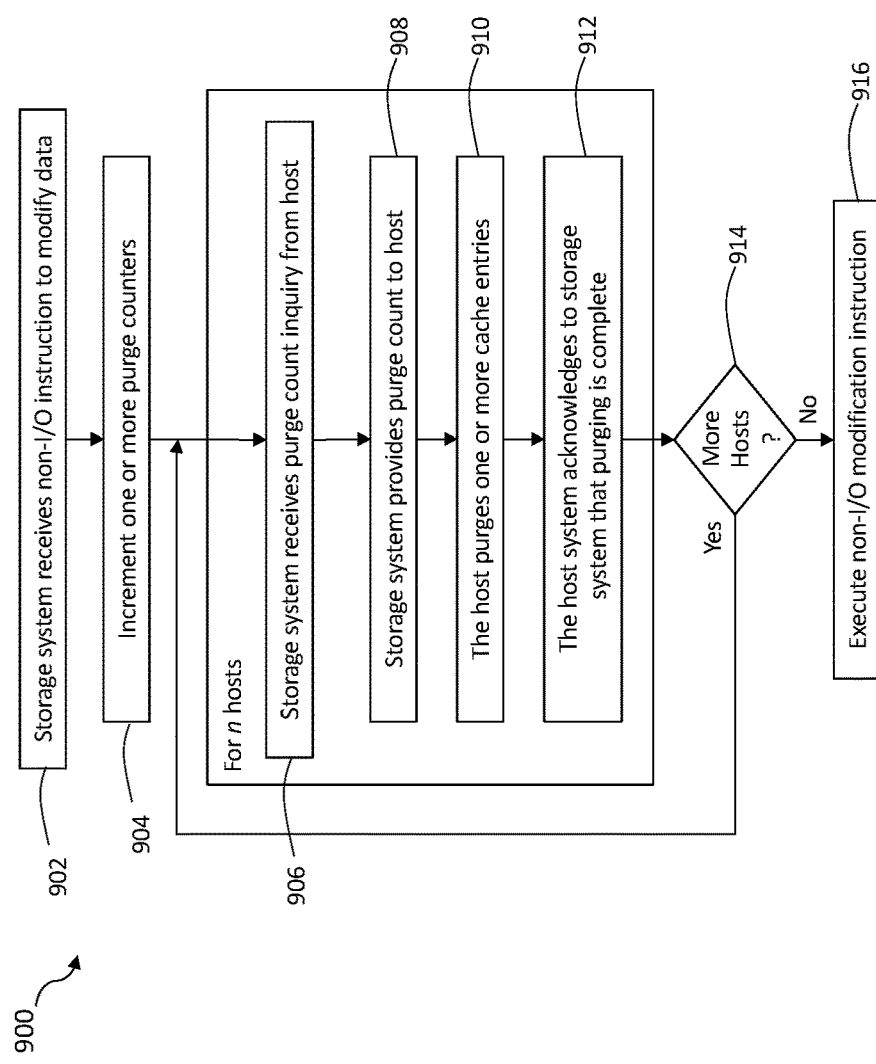

HOST CACHE COHERENCY WHEN READING DATA

BACKGROUND

Technical Field

This application generally relates to data storage systems, and more particularly to maintaining host cache coherency on a storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may have host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In some embodiments, for a data storage network including a data storage system and one or more host systems having applications executing thereon, the execution of which results in data being stored on one or more physical storage devices of the data storage system, a method is performed. The method includes, on a first of the one or more host systems, maintaining a cache including a plurality of entries, wherein a first of the plurality of entries represents a portion of data is stored on a first of the one or more physical storage devices, and the first entry specifies a particular version of the portion of data. The method further includes receiving a read request on the first host system from the first application, sending a communication from the first host system to the data storage system to determine if the particular version specified by the first entry is a latest version of the portion of data, and, if it is determined that the particular version is the latest version of the portion of data, retrieving the portion of data from the first entry to satisfy the read request.

The method may further include determining whether the first portion of data is being used by at least a second of the one or more host systems, where the steps of sending and retrieving are performed in response to determining that the first portion of data is being used by at least the second host system.

The method may further include, if it is determined that the first portion of data is not being used by at least the second host system, retrieving the portion of data from the first physical storage device to satisfy the read request.

The method may further include storing on the host system a first value indicating whether the first portion of data is being used by at least a second of the one or more storage systems, where determining whether the first portion of data is being used by at least a second of the one or more storage systems includes accessing the first value on the host system.

The method may further include, if it is determined that the particular version is not the latest version of the portion of data, retrieving the portion of data from the first physical storage device. Each entry of the cache may represent a portion of data, and specifies a logical storage unit and version of the respective portion, Further, the first host system may be connected directly to an internal fabric of the data storage system without an intervening component of the storage system controlling access of the at least first host system to the internal fabric, where the communication is sent directly to the internal fabric without going through any intervening component of the storage system.

In some embodiments, a first host system of a data storage network including a data storage system and one or more host systems having applications executing thereon, including the first host system, is provided. The first host system includes, one or more processors and a memory including code stored thereon that, when executed, performs the above-described method.

In some embodiments, one or more computer-readable media, for example, non-transitory computer-readable media, are provided having software stored thereon, the software including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 4 is a block diagram illustrating an example of a system including a host system communicatively coupled to a data storage system via multiple I/O paths, according to embodiments of the invention;

FIG. 5 is a block diagram illustrating an example of a plurality of logical layers of a combination of a host system and a data storage system for processing an I/O request, according to embodiments of the invention;

FIG. 9 is a flow chart illustrating an example of a method of maintaining host cache coherency when modifying data on a storage system, according to embodiments of the invention;

FIG. 10 is a flow chart illustrating an example of a method of a host system purging one or more host cache entries, according to embodiments of the invention.

DETAILED DESCRIPTION OF EMBODIMENTS

Figure 1:
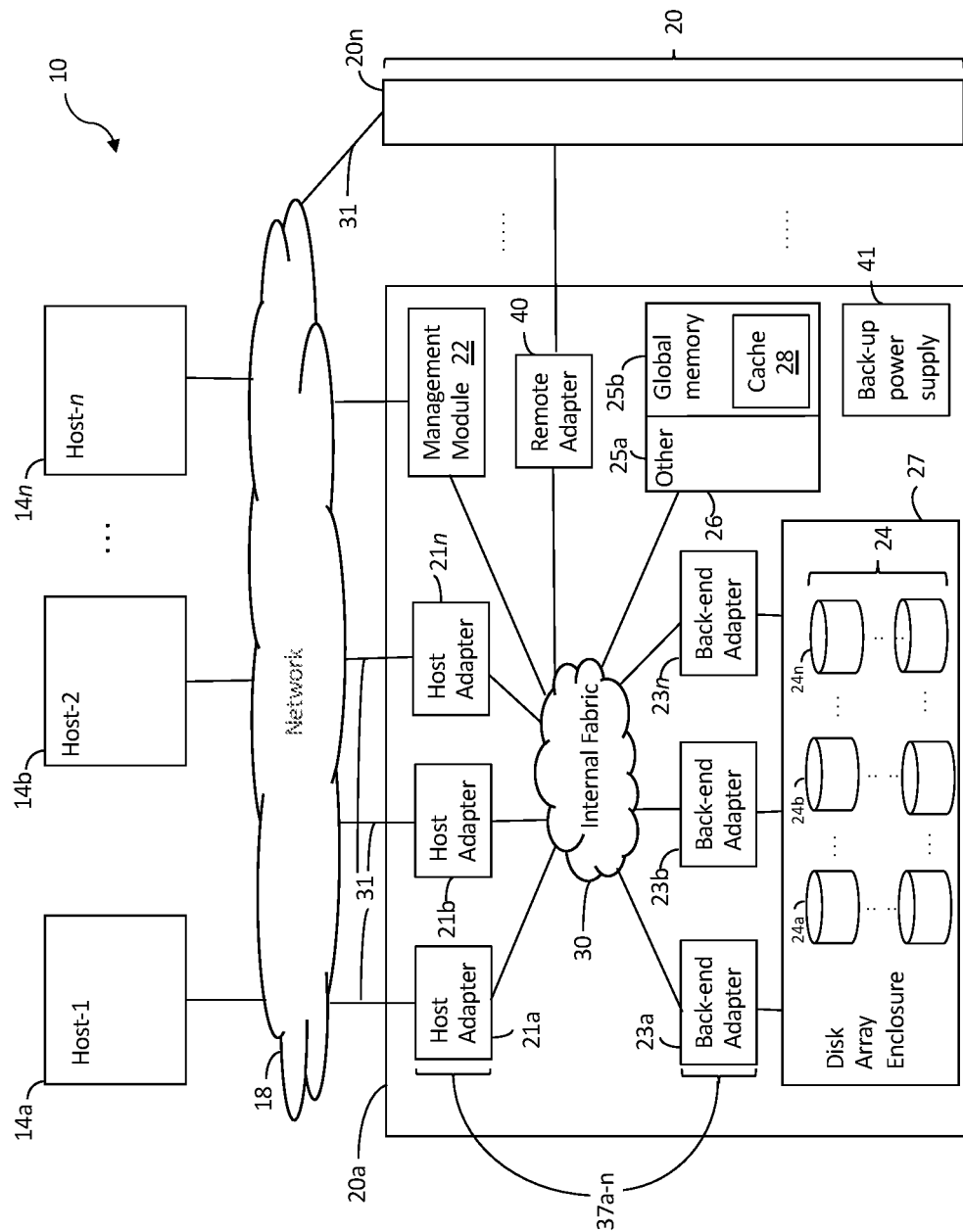
FIG. 1 is a block diagram illustrating an example of a data storage network, according to embodiments of the invention.

In some data storage networks, I/O data for an application executing on a host system is cached on the host system, for example, on a memory card (e.g., a PCIe memory card) installed on the host. Caching I/O data on a host system ("host caching") can provide faster response times for read operations. That is, instead of having to submit a read request from the host system across a network fabric (e.g., through a switch) of a the data storage network to the storage system to retrieve data from a physical storage device or global memory (e.g., cache) of the storage system, the data can be read directly from the host cache, which could have access times on the order of tens or hundreds of microseconds.

Host caching may be an optimal solution for reducing read response times when the data to be read is used by only one host system. However, when multiple host systems are using (i.e., sharing) data stored on a data storage system, it becomes necessary to maintain consistency between the data cached on each host; i.e., to maintain host cache coherency. This may be achieved by exchanging communications between host system over a communication network between the host systems, for example, in accordance with Ethernet and/or other networking technologies. These additional communications and other overhead associated with maintaining host cache coherency may introduce additional delay and computational cost that negate the benefit of improved read response times that host caching provides.

What is desired is a faster way to maintain host cache coherency when implementing host caching; i.e., to reduce the response time delays added by maintaining host cache coherency.

Described herein are mechanisms and techniques for maintaining host cache coherency. These system and techniques may reduce response time delays introduced by maintaining cache coherency such that the benefit of decreased read response times afforded by host caching outweighs the drawbacks of time delays and computation costs of maintaining host cache coherency.

In some embodiments of the system, a host system may maintain a host cache, for example, on an NVME card, 3DXP card, on-chip memory of a host CPU or another type of memory. For each logical storage unit (LSU, e.g., logical device) corresponding to an application executing on a host system, the host system may cache one or more data portions in the host cache, and may communicate with the storage system to determine whether any other host systems also share data for the LSU. The host system may record, for each LSU, whether the LSU (i.e., the data of the LSU) is shared with one or more other host systems, or is exclusive to the host system, for example, in a table or other data structure (e.g., an exclusivity table).

In some embodiments, for each portion of data (e.g., block or track) stored in a host cache, a version of the data portion stored in the cache may be maintained, and a latest version of the data portion on the storage system may be maintained on the storage system.

When a read request for the data portion is received from an application executing on the host, the host may determine whether the data portion is in cache, and if so, whether the LSU of the data portion is shared by one or more other host systems, for example, by accessing the exclusivity table. If it determined that there is at least one other host system sharing the LSU, a latest version stored on the storage system may be determined and compared to the version stored in the host cache. If there are no other host systems sharing the LSU, or if the version in the host cache is the same as the latest version stored on the storage system, the data portion may be retrieved from the host cache. If the data portion is not stored in the host cache, or if the version in the host cache is not the latest version stored on the storage system, the data portion may be retrieved from the storage system, and the host cache may be updated with the latest version of the data portion.

In some embodiments of the invention, the host system is directly connected to an internal switching fabric ("internal fabric") of the data storage system without an intervening component of the storage system (e.g., a director) controlling access of the host system to the internal fabric. For example, the host system may include a storage system interface (SSI) physically connected to a remainder of the host system by one or more busses (e.g., in accordance with PCIe technology), and which may be physically connected directly to the internal fabric of the data storage system. Such direct connection to the internal fabric may reduce (e.g., substantially) I/O (e.g., read and write) response times and access times to other information (e.g., metadata) on the storage system.

In some embodiments, host cache coherency may be maintained between hosts systems by each host system exchanging communications with the storage system, for example, over a direct connection to the internal fabric of the storage system, as opposed to the host systems exchanging communications with each other over an external communications network. For example, the latest version of a data portion may be determined by the host system (e.g., the SSI of the host system) directly communicating with the storage system over the internal fabric.

In some embodiments, the host system may include a cache management driver (CMD) that manages the host cache. The CMD may manage communication between a host OS and an SSI of the host system. For example, the host system may be part of a multi-path (MP) driver, which may reside on a part of the host system separate from the SSI, e.g., separated by one or more PCIe interconnects (e.g., busses) from the SSI.

In some embodiments, an operation (e.g., a management operation) performed on a data storage system may result in some data (e.g., data of one or more LSUs, for example, logical devices) or all data stored on a storage system being modified or subject to possible modification. For example, following a system failure or perhaps a scheduled re-boot, data may be restored to an earlier state, for example, as part of a snap restore or back-up restore. In such scenarios, it may be desirable to purge any data portions of the affected data (e.g., of one or more LSUs) from host caches to maintain cache coherency.

In some embodiments, the storage system may maintain one or more counters (which may be referred to herein as "purge counters"). A single purge counter may be maintained for a storage system, or separate purge counters may be maintained for multiple LSUs (e.g., logical devices). When an instruction is received to perform an operation that will modify data across one or more LSUs (e.g., a non-I/O instruction such as an instruction to perform a snap restore or back-up restore), the one or more purge counters for affected LSUs may be incremented. One or more host systems implementing host caching may periodically poll the storage system to determine the purge counter value. Each such host system may record the current value, and then compare it to a next purge counter value determined during a next polling. When the current value of the purge counter value is different than a previous purge counter value, the host system may purge from its host cache any data portions for LSUs associated with the purge counter (e.g., any LSU for which data is stored on the data storage system).

In some embodiments, the data storage system will not execute the data modification instruction (e.g., snap restore) until it receives acknowledgement from all host systems caching data affected by the data modification that the host system has purged any host cache entries corresponding to the LSUs affected by the modification.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, GenZ, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
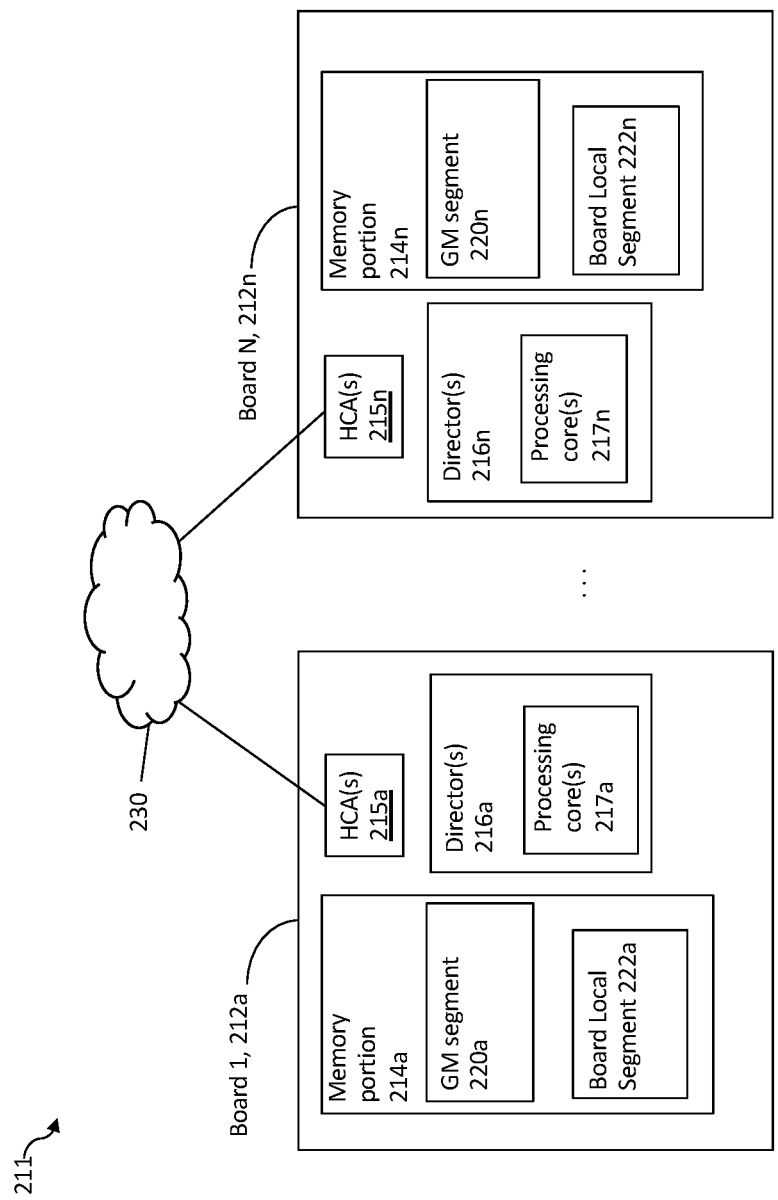
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC.

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process I/O on storage system 20a, including data structures to manage the mapping of LSUs and locations thereon to physical storage devices and locations thereon. Such data structures may be stored in any of memory 26, including GM 25b and memory 25a, GM segment 220a-n and/or board local segments 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
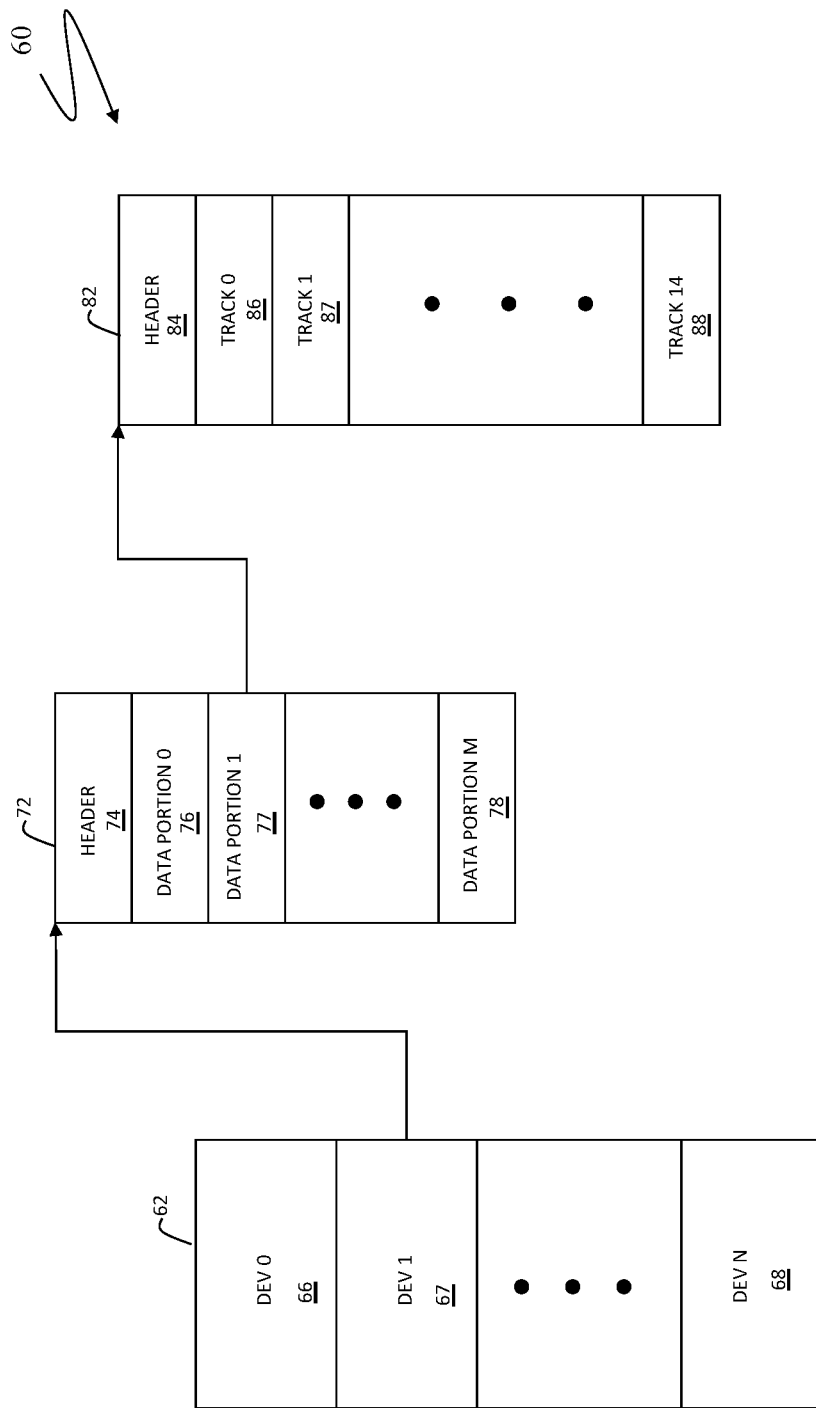
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 500, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein.

Figure 3C:
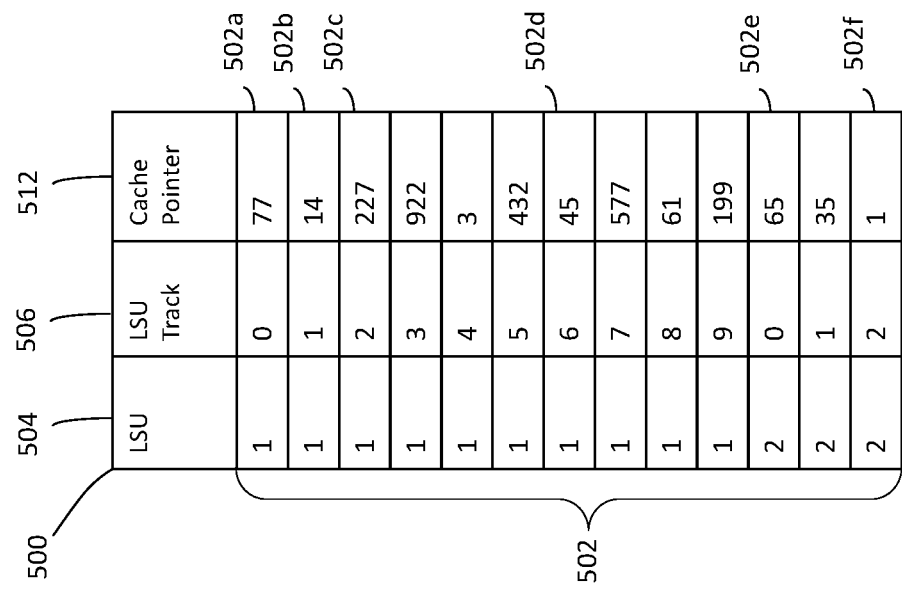
FIG. 3C is a block diagram illustrating an example of a data structure for mapping logical storage unit tracks to cache slots, according to embodiments of the invention.
Figure 3B:
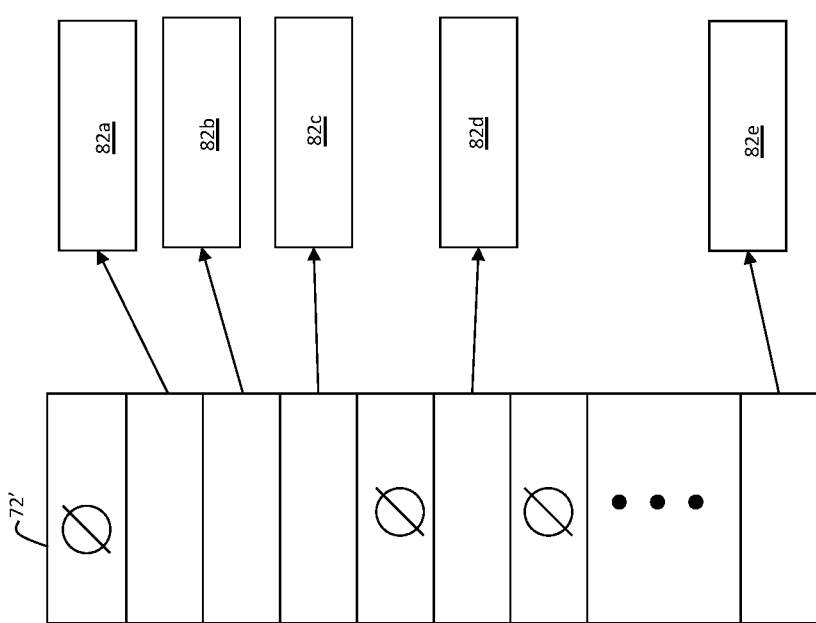
FIG. 3B a block diagram illustrating an example of a table used for a thin logical device, according to embodiments of the invention.

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 3C is a block diagram illustrating an example of a data structure 500 for mapping LSU tracks (e.g., thin device tracks) to cache slots of a cache. Data structure 500 may be referred to herein as a "cache slot table." Cache slot table 500 may include a plurality of entries (i.e., rows) 502, each row representing an LSU track (e.g., any of LSU tracks 86-88 in track table 82) identified by an LSU ID in column 504 and an LSU track ID (e.g., number) identified in column 506. For each entry of cache slot table 500, column 512 may specify a cache location in a cache corresponding to the logical storage device track specified by columns 504 and 506. A combination of an LSU identifier and LSU track identifier may be used to determine from columns 504 and 506 whether the data of the identified LSU track currently resides in any cache slot identified in column 512. Through use of information from any of tables 62, 72, 72' and 82 described in more detail elsewhere herein, the one or more LSU tracks of an LSU specified in an I/O operation can be mapped to one or more cache slots. Further, using the same data structures, the one or more physical address ranges corresponding to the one or more LSU tracks of the LSU may be mapped to one or more cache slots.

The tables 62, 72, 72', 82 and 500 of FIGS. 3A-3C 4 may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82 and 500. Other data structures may be stored in any of GM 25b, memory 25a, GM segment 220a-n and/or board local segments 22a-n.

FIG. 4 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage physical storage device 130 may be configured to include three LSUs—LUN5, LUN6 and LUN10. It should be noted that in the illustrative embodiment of FIG. 4, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LSUs of physical storage device 130, configured to be accessible to the host system 102 over multiple I/O paths. As such, each of the I/O operations may be forwarded from the application 104 to the data storage system 120 over one of the possible multiple I/O paths.

The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more I/O paths. For example, all LSUs of physical storage device 130 may be accessible using ports of the three FEs 122a-122c, also denoted respectively as host adapters HA1, HA2 and HA3. The multiple I/O paths allow the application I/Os to be routed over multiple I/O paths and, more generally, allow the LSUs of physical storage device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LSUs of the physical storage device 130 in order to determine which of the multiple I/O paths are active or available at a point in time, which of the multiple I/O paths are unavailable for communications, and to use such information to select an I/O path for host system-data storage system communications.

In the example of the system 100, each of the LSUs of the physical storage device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three I/O paths—a first I/O path represented by A1-B1, a second I/O path represented by A2-B2 and a third I/O path represented by A3-B3.

FIG. 5 is a block diagram illustrating an example of a plurality of logical layers 150 of a combination of a host system (e.g., the host system 102 of FIG. 3) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 5 provides further detail regarding various software layers that may be used in connection with the MP driver 106 of FIG. 4. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 4. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received I/O request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the I/O operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 5, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125a) or files (implemented using the file system 123), whereby such I/O requests may be mapped to I/O communications (specifying the I/O operation) directed to LSUs of the data storage system. Such I/O operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to I/O operations and other non-I/O commands such as related to host system control operations. I/O operations may include, for example, read and write operations with respect to data stored on an LSU.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 4) and a second endpoint which is a port of an HA (e.g., such as B1-B3 of FIG. 4) in the data storage system. Through each such I/O path, one or more LSUs may be visible or exposed to the host system initiator through the target port of the data storage system.

In some embodiments of the invention, a host system is directly connected to an internal fabric of a storage system; i.e., the host is connected to the internal fabric without an intervening director (e.g., FA) or other component of the storage system controlling the host system's access to the internal fabric. For example, rather than a host system (e.g., host 14a) being physically coupled to a network (e.g., network 18), which is coupled to an FA (e.g., host adapter 21a), which is coupled to an internal fabric (e.g., internal fabric 30) of a storage system (e.g., storage system 20a), where the FA controls the host system's access to other components (e.g., GM 25b, other directors 37a-n) of the storage system over the internal fabric as illustrated in FIG. 1, the host system may be directly connected to the internal fabric, and communicate with other components of the storage system over the internal fabric independently of any FA or external network. In some embodiments, the host system may communicate with physical storage devices and/or GM over an I/O path that does not include any directors (e.g., FAs or BEs), for example, over the internal fabric to which the host system is directly attached. In embodiments in which at least a portion of the GM is considered part of a director, the host system may be configured to communicate with such GM directly; i.e., over the internal fabric and without use of director compute resources (e.g., a CPU core and/or CPU complex).

In some embodiments, the GM may include persistent memory for which data stored thereon (including state information) persists (i.e., remains available) after the process or program that created the data terminates, perhaps even after the storage system fails (for at least some period of time). In some embodiments, the internal fabric exhibits low latency (e.g., when IB is employed). In such embodiments, by enabling a host system to directly access GM of the storage system, which may include persistent memory, host systems may be configured to expand their memory capacity, including persistent memory capacity by using the memory of the storage system. Thus, a system administrator could expand the memory capacity, including persistent memory capacity of the hosts of a storage network without having to purchase, deploy and configure new host systems. Rather, the system administrator may configure existing host systems to utilize the GM of the storage system, and/or purchase, install and configure one or more storage system interfaces (SSIs; described elsewhere herein in more detail) on existing host systems, which may result in significant savings in time and cost. Further, because of the security advantages provided by the SSI described in more detail elsewhere herein, use of the GM may prove more secure than memory, including persistent memory, added to host systems to expand memory capacity.

In some embodiments, an SSI located externally to the storage system may be provided that serves as an interface between the host system and storage system. The SSI may be part of the host system, and in some embodiments may be a separate and discrete component from the remainder of the host system, physically connected to the remainder of the host system by one or more buses that connect peripheral devices to the remainder of the host system. The SSI may be physically connected directly to the internal fabric. In some embodiments, the SSI may be implemented on a card or chipset physically connected to the remainder of a host system by a PCIe interconnect.

A potential benefit of implementing an SSI as a physically separate and discrete component from the remainder of a host system is that the SSI's resources may be configured such that its resources are not available for any functions, tasks, processing or the like on the host system other than for authorized I/O processing. Thus, I/O performance may be improved and more deterministic, as SSI resources may not be depleted for non-PO-related tasks on the host system. Further, as a physically separate and discrete component from the remainder of the host system, the SSI may not be subject to the same faults as the remainder of the system, i.e., it may be in a different fault zone from the remainder of the host system.

The SSI may provide functionality traditionally provided on storage systems, enabling at least some I/O processing to be offloaded from storage systems to SSIs, for example, on host systems. Metadata about the data stored on the storage system may be stored on the SSI, including any metadata described herein. The SSI may be configured to determine whether an I/O operation is a read or write operation, and process the I/O operation accordingly. If the I/O operation is a read operation, the SSI may be configured to determine from metadata whether the data to be read is in cache on the storage system. If the data is in cache, the SSI may read the data directly from cache over the internal fabric without use of CPU resources of a director, and, in some embodiments, without use of a director at all. If the data is not in cache, the SSI may determine, from the metadata, the physical storage device and physical location (e.g., address range) therein of the data to be read. The data then may be read from the physical storage device over the internal fabric without use of a director. Data may be read from a cache or physical storage device to the SSI using RDMA communications that do not involve use of any CPU resources on the storage system, SSI or the host system (e.g., other parts thereof), thereby preserving CPU resources on the storage network.

The I/O processing capabilities of an SSI may be used to offload I/O processing from a storage system, thereby reducing consumption of I/O compute resources on the storage system itself. The overall storage compute capacity of a storage network may be increased without having to upgrade or add a storage system.

In some embodiments, an SSI may implement one or more technology specifications and/or protocols, including but not limited to, NVMe, NVMf and IB. For example, SSI may be configured to exchange I/O communications with the remainder of the host system in accordance with NVMe. In embodiments in which an SSI is configured to communicate in accordance with NVMe, as opposed to in accordance with a native platform (including an OS or virtualization platform) of the host system, significant development and quality assurance costs may be realized, as developing or upgrading an SSI for each new or updated native platform may be avoided. Rather, the native platform may conform to NVMe, an industry standard, and support an OS-native inbox NVMe driver.

In some embodiments, secure access to data on a storage system via direct connection to an internal fabric may be provided. An SSI may validate each I/O communication originating on the host system before allowing a corresponding I/O communication to be transmitted on the internal fabric. The validation may include applying predefined rules and/or ensuring that the I/O communication conforms to one or more technologies, e.g., NVMe. Additional security measures may include requiring validation of any SSI software or firmware before loading it onto the SSI, for example, using digital signatures, digital certificates and/or other cryptographic schemes, to ensure unauthorized code is not loaded onto the SSI that could enable unauthorized I/O activity on a storage system. Further, in some embodiments, the SSI may be configured to encrypt I/O communications originating on a host system and to decrypt I/O communications received from the storage system, for example, in embodiments in which data is encrypted in flight between the host system to physical storage devices, and data may be encrypted at rest in memory of the storage system and/or on physical storage devices.

In addition, data integrity (e.g., checksums) in accordance with one or more technologies (e.g., T10DIF) may be employed by the SSI on I/O communications exchanged between host systems and data storage systems, by which end-to-end data integrity between a host system and physical storage devices may be implemented, as described in more detail herein.

In some embodiments, in addition to an SSI communicatively coupled between a host operating system and an internal fabric of a storage system, a storage network may include an interface communicatively coupled between an internal fabric and a DAE that encloses a plurality of physical storage devices; i.e., a fabric-DAE interface ("FDI"). The FDI may be configured to employ any of a plurality of technologies, including NVMe, NVMf and IB, as described in more detail herein. In such embodiments, I/O communications configured in accordance with NVMe may be implemented end-to-end from a host system to physical storage device, as described in more detail herein.

As described in more detail herein, through an SSI, a host system may exchange I/O communications, including control information (e.g., commands) and data, with GM including cache along an I/O path including internal fabric without use of compute resources of any of directors. Further, through an SSI, a host system may exchange I/O communications, including control information (e.g., commands) and data, with physical storage devices along an I/O path including internal fabric and not including use of directors. Thus, an I/O path in a known storage network, which may include an HBA, an external network, an FA, an internal fabric, a BE, a PCI switch and a physical storage device, may be replaced with an I/O path in accordance with embodiments of the invention, which includes an SSI, an internal fabric, an FDI and a physical storage device. These new I/O paths, eliminating use of external networks and director compute resources (or directors altogether) may produce reduced response times for certain I/O operations, as described in more detail elsewhere herein.

By removing an external network from the I/O path between a host system and a storage system, and routing I/O requests (e.g., all I/O requests on a storage network) through one or more SSIs, the possible sources of malicious actions or human error can be reduced; i.e., the attack surface of a storage system can be reduced. Further, by implementing validation logic as described in more detail herein, in particular as close as possible (logically) to where an SSI interfaces with a remainder of a host system (e.g., as close as possible to physical connections to peripheral device interconnects), for example, within an NVMe controller, the storage system may be made more secure than known storage networks having I/O paths including external networks. To further reduce access to an SSI, an NVMe driver may be configured as the only interface of an SSI made visible and accessible to applications on a host system. Any other interfaces to an SSI, for example, required for administration, may be made accessible only through certain privileged accounts, which may be protected using security credentials (e.g., encryption keys).

It should be appreciated that, although embodiments of the invention described herein are described in connection with use of NVMe, NVMf and IB technologies, the invention is not so limited. Other technologies for exchanging I/O communications, for example, on an internal fabric of a storage system, may be used.

Figure 6:
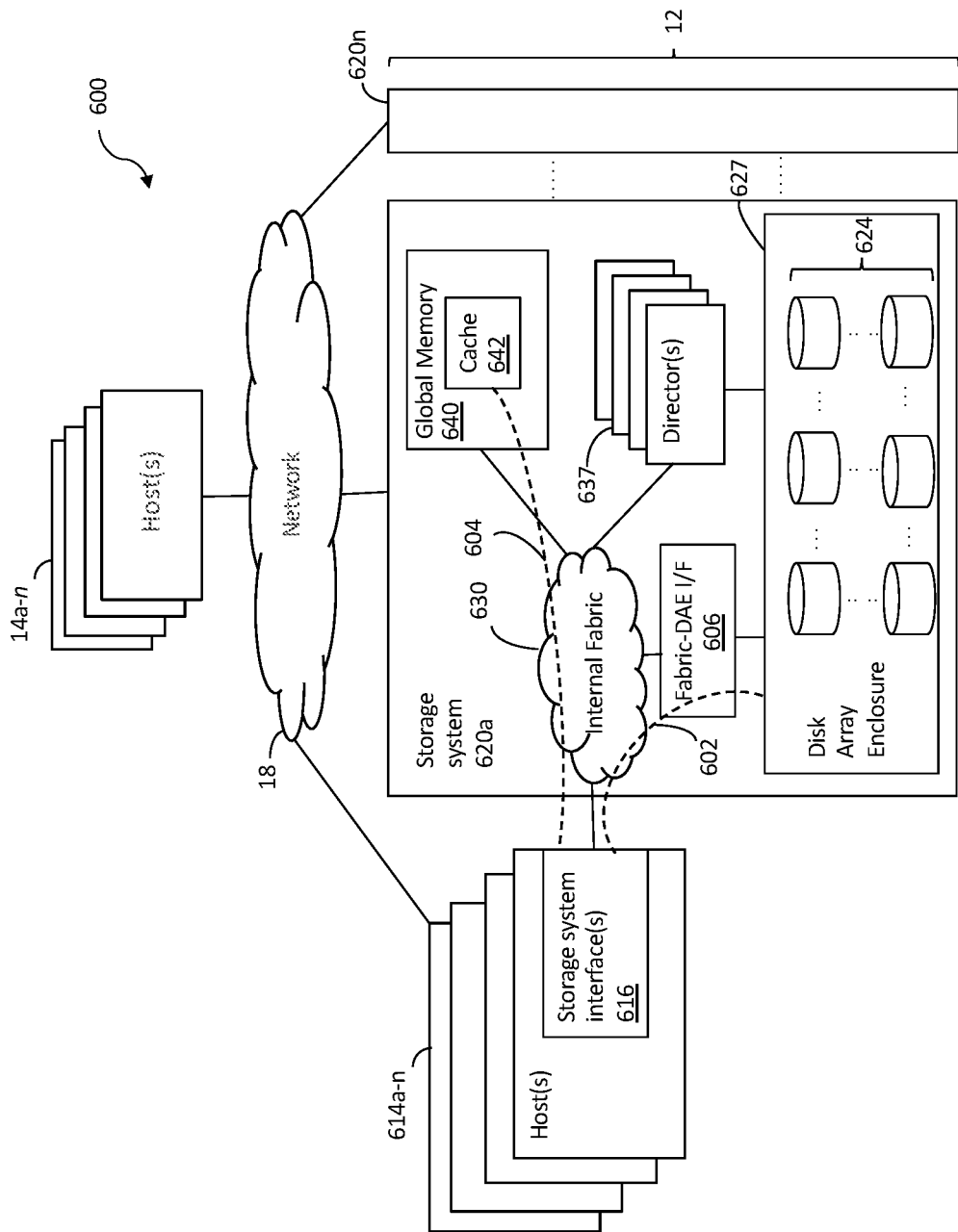
FIG. 6 is a block diagram illustrating an example of a data storage network, including one or more host systems directly connected to internal fabric of a storage system, according to embodiments of the invention.

FIG. 6 is a block diagram illustrating an example of a storage network 600 including one or more host systems 614a-n directly connected to an internal fabric 630 of a storage system 620a, according to embodiments of the invention. Other embodiments of a storage network including one or more host systems directly connected to an internal fabric of a storage system, for example, variations of system 600, are possible and are intended to fall within the scope of the invention.

Storage network 600 may include any of: one or more host systems 14a-n (described in more detail elsewhere herein); network 18 (described in more detail elsewhere herein); one or more host systems 614a-n; one or more storage systems 620a-n; and other components. Storage system 620a may include any of: GM 640 (e.g., any of 25b, 220a-n and/or 220); one or more directors 637 (e.g., 37a-n); a plurality of physical storage devices 624 (e.g., 24), which may be enclosed in a disk array enclosure 627 (e.g., 27); internal fabric 630 (e.g., internal fabric 30); FDI 606, other components; or any suitable combination of the foregoing. Internal fabric 630 may include one or more switches and may be configured in accordance with one or more technologies, for example, IB. In some embodiments, at least a portion of GM 640, including at least a portion of cache 642, may reside on one or more circuit boards on which one of the directors 637 also resides, for example, in manner similar to (or the same as) boards 212a-n described in relation to FIG. 2. In such embodiments, a director 637 may be considered to include at least a portion of GM 640, including at least a portion of cache 642 in some embodiments. FDI 606 may be configured to manage the exchange of I/O communications between host system 614a-n directly connected to internal fabric 630 and physical storage devices 624 (e.g., within DAE 627), as described in more detail elsewhere herein.

Each of host systems 614a-n may include SSI 616 connected directly to internal fabric 630 and configured to communicate with GM 640 and physical storage devices 624 (e.g., via FDI 606) over the internal fabric 630 independently of any of the directors 637 or any external network, for example, network 18. In embodiments in which one or more directors 637 may be considered to include at least a portion of GM 640, including at least a portion of cache 642 in some embodiments, SSI 616 may be configured to communicate with such GM 640, including cache 642, directly without use of any compute resources (e.g., of a CPU core and/or CPU complex) of any director 637. For example, SSI 616 may be configured to use RDMA as described in more detail herein. Thus, embodiments of the invention in which a host system, or more particularly an SSI, communicates directly with a GM or cache of a storage system include: the host system communicating with a portion of GM or cache not included in a director independently of any director; and/or the host system communicating with a portion of GM or cache included in a director independently of any compute resources of any director. In both cases, communicating directly with a GM or cache of a storage system does not involve use of any compute resources of the director.

The GM 640 may include persistent memory for which data stored thereon persists after the process or program that created the data terminates. For example, at least portions of GM may be implemented using DIMM (or another type of fast RAM memory) that is battery-backed by a NAND-type memory (e.g., flash). In some embodiments, the data in such persistent memory may persist (for at least some period of time) after the storage system fails.

As illustrated in FIG. 6, each of host systems 614a-n may be connected to any of storage system 620a-n through network 18, for example, through an HBA on the host. While not illustrated in FIG. 6, one or more of SSIs 616 may be connected to one or more other storage systems of storage systems 620a-n. It should be appreciated that any of hosts 614a-n may have both: one or more HBAs for communicating with storage systems 620a-n over network 18 (or other networks); and one or more SSIs 616 connected directly to an internal fabric of one or more storage systems 620a-n and configured to communicate with GM and physical storage devices over the internal fabric independently of any directors or external network.

One or more of the directors 637 may serve as BEs (e.g., BEs 23a-n) and/or FAs (e.g., host adapter 21a-n), and enable I/O communications between the storage system 620a and hosts 14a-n and/or 614a-n over network 18, for example, as described in relation to FIG. 1. Thus, a storage system 620a may concurrently provide host access to physical storage devices 624 through: direct connections to internal fabric 630; and connections via network 18 and one or more directors 637.

Figure 7:
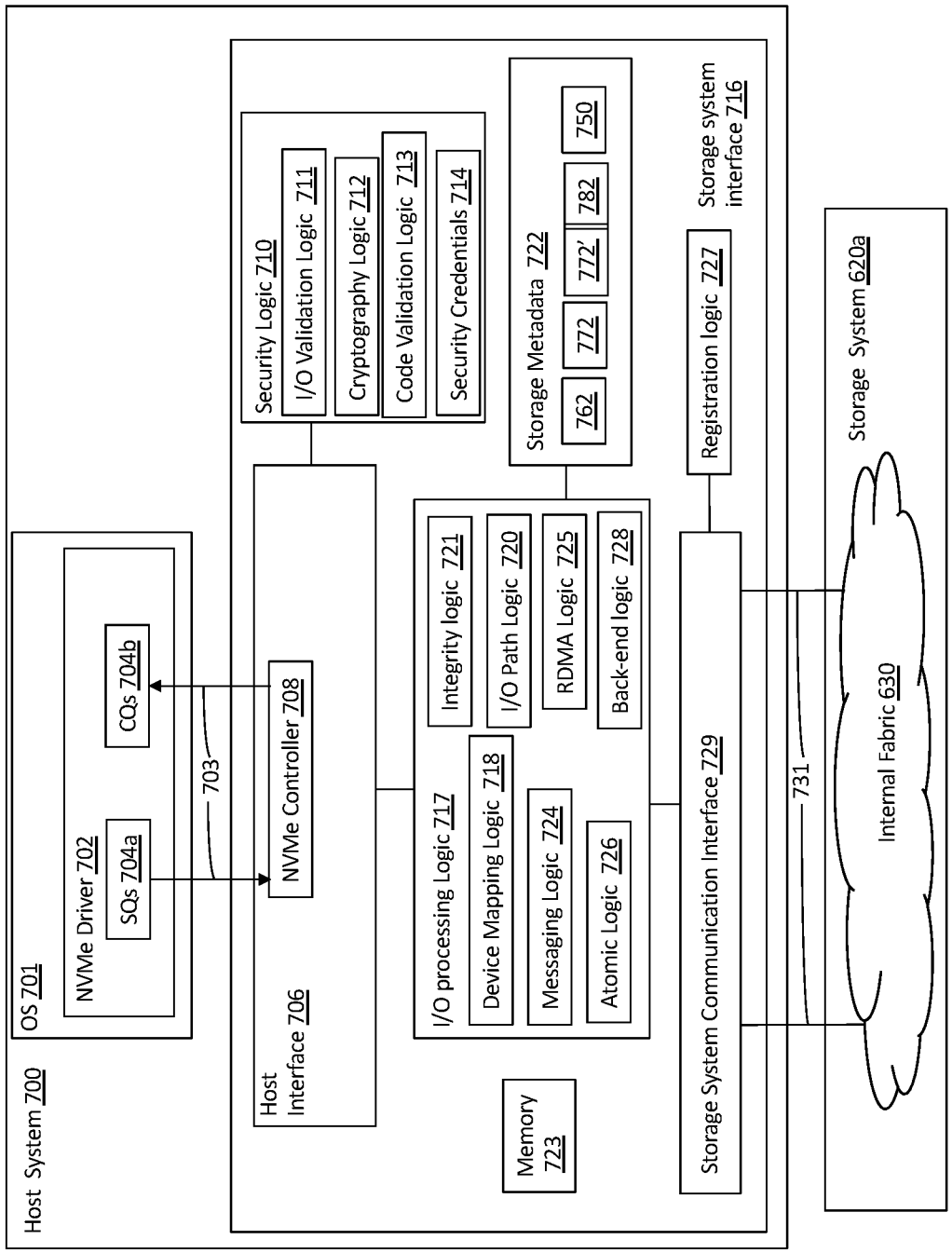
FIG. 7 is a block diagram illustrating an example of a storage system interface of a host system directly connected to internal fabric of a storage system, according to embodiments of the invention.

SSI 616 may be implemented as SSI 716 described in relation to FIG. 7. FIG. 7 is a block diagram illustrating an example of an SSI 716 of a host system 700 directly connected to an internal fabric 630 of a storage system, according to embodiments of the invention. Other embodiments of an SSI of a host system directly connected to an internal fabric of a storage system, for example, variations of SSI 716, are possible and are intended to fall within the scope of the invention.

Host system 700 (e.g., one of host systems 614a-n) may include any of: operating system (OS) 701; an SSI 716 (e.g., SSI 616); one or more peripheral device interconnects 703; other components; and any suitable combination of the foregoing. Host OS 701 may be configured to execute applications running on the host system, which may result in I/O operations for data stored on any of storage systems 620a-n, requiring I/O communications to be exchanged between the host system and the one or more storage systems 620a-n. Host OS 701 may be any suitable operating system for processing I/O operations, for example, a version of Linux, or a hypervisor or kernel of a virtualization platform, for example, a version of VMware ESXi™ software available from VMware, Inc. of Palo Alto, Calif. Other operating systems and virtualization platforms that support an NVMe driver may be used.

In some embodiments, SSI 716 may be physically separate and discrete from the remainder of host system 700, the remainder including the OS 701 of the host system and the hardware and firmware on which the OS 701 executes, and SSI 716 may be pluggable into host system 700, which may be physically configured to receive SSI 716. In such embodiments, the SSI 716 may be considered a first physical part of the host system, for example, a peripheral component or device of the host system, and the remainder of the host system may be considered a second physical part of the host system. For example, SSI 716 may be configured to physically connect to the other part of the host system 700 by the one or more peripheral device interconnects 703, which may be configured in accordance with one or more technologies (e.g., PCIe, GenZ, another interconnect technology, or any suitable combination of the foregoing). An interconnect configured to connect to, and enable communications with, a peripheral component or device may be referred to herein as a "peripheral device interconnect," and a peripheral device interconnect configured in accordance with PCIe referred to herein as a "PCIe interconnect." SSI 716 may be implemented on a card or chipset, for example, in the form of a network interface controller (NIC), which may be configured with additional logic as described herein such that the resulting device may be considered a smart NIC ("SmartNIC"). As is described in more detail herein, SSI 716 may include an operating system for executing one or more I/O-related functions. Thus, in some embodiments, a first one or more operating systems (e.g., host OS 701) may be executing applications (e.g., on first part of the host 700) that result in I/O operations, while SSI 716 includes one or more second operating systems for performing functions and tasks on SSI 716 in relation to processing such I/O operations, such functions and tasks described in more detail elsewhere herein.

In some embodiments, SSI 716 may be configured to communicate according to a PCIe specification over one or more peripheral device interconnects 703, and SSI 716 may be configured to communicate according to an NVMe specification such that the SSI 716 presents itself as one or more NVMe devices (e.g., drives) to the host system 700. For example, the host interface 706 may include an NVMe controller 708 configured to exchange I/O communication according to NVMe with NVMe queues within an NVMe driver 702 of OS 701. That is, the OS 701 of the host system 700 may include an NVMe driver 702 configured to exchange I/O communications with the NVMe controller 708 in accordance with NVMe. To this end, the NVMe driver 702 may include at least two I/O queues, including one or more submission queues (SQs) 704a for submitting commands via a peripheral device interconnect 703 (configured as a PCIe interconnect) to NVMe controller 708, and may have one or more completion queues (CQs) 704b for receiving completed commands from NVMe controller 708 via one or more interconnects 703. Each SQ may have a corresponding CQ, and, in some embodiments, multiple SQs may correspond to the same CQ. In some embodiments, there may be up to 64K I/O queues in accordance with a version of the NVMe specification. The NVMe driver 702 also may include an admin SQ and CQ pair for control management in accordance with a version of the NVMe specification, and NVMe driver 702 and NVMe controller 708 may be configured to exchange control management communications with each other using admin SQs and CQs in accordance with a version of the NVMe specification.

SSI 716 may include any of: host interface 706; security logic 710; I/O processing logic 717; storage metadata (MD) 722; storage system communication interface (SSCI) 729; registration logic 727; memory 723; other components; or any suitable combination of the foregoing.

Registration logic 727 may be configured to register host system 700 and/or SSI 716 with storage system 620a when SSI 716 is connected to internal fabric 630, to enable future communication between the storage system 620a and internal fabric 630.

Security logic 710 may include any of: I/O validation logic 711; cryptographic logic 712; code validation logic 713; security credentials 714; other components; or any suitable combination of the foregoing. I/O validation logic 711 may prevent any undesired (e.g., invalid) communications from being further processed by SSI 716 or storage system 620a. Security logic 710, and more specifically I/O validation logic 711, may be a first component of SSI 716 to act on a communication received on one of the peripheral device interconnects 703, to ensure that any undesired communications do not proceed any further within SSI 716 and storage system 620a. To this end, it should be appreciated that one or more aspects of security logic 710, including I/O validation logic 711 and code validation logic 713, or portions thereof, may be implemented as part of host interface 706, for example, as part of NVMe controller 708.

I/O validation logic 711 may include logic that verifies that a communication received on one of peripheral device interconnects 703 is indeed an I/O communication authorized to be transmitted on SSI 716. For example, I/O validation logic 711 may be configured to ensure that a received communication is an I/O communication properly configured in accordance with NVMe, and to reject (e.g., discard or drop) any received communications not properly configured. Further, I/O validation logic 711 may be configured to allow only a certain subset of I/O operations, for example, read or write operations, and reject other I/O operations, for example, operations to configure storage and/or other storage management operations. Such stipulations may be captured as one or more user-defined rules that may be defined and stored (e.g., in a rules data structure) within SSI 716. It should be appreciated that rules may be specific to one or more storage-related entities, for example, users, groups of users, applications, storage devices, groups of storage devices, or other property values. Thus I/O validation logic 711 may be configured to implement any of a variety of business rules to control access to resources on storage system 620a.

Cryptographic logic 712 may be configured to encrypt data included in I/O communications received from host OS 701 and before repackaging the data (in encrypted form) in I/O communications transmitted over internal fabric 630 to components of storage system 620a. Cryptographic logic 712 also may be configured to decrypt data from I/O communications received from internal fabric 620a before sending the unencrypted data in I/O communication to host OS 701. Any of a variety of cryptographic schemes may be used, including use of symmetric and/or asymmetric keys, which may be shared or exchanged between SSI 716 of the host system, one of more storage systems 620a-n, and one or more SSIs of other host systems 614a-n, depending on what entities are entitled access to the data. For example, during a manufacturing and/or configuring of SSIs 716 and/or storage systems 620a-n, one or more encryption keys and/or other secrets (collectively, "security credentials") may be shared, to enable implementation of the given cryptographic scheme, and may be stored as part of security credentials 714.

In embodiments in which data is encrypted on SSI 716 before being transmitted to the storage system 620a, the data may be stored in encrypted form in physical storage devices 624 and/or GM 640. In such embodiments, directors 637 and other components that may be authorized to access the encrypted data also may be configured to implement whatever cryptographic scheme is being employed, which may be desirable for host systems (e.g., host systems 14a-n) that may access storage system 620a by means other than an SSI as described herein. In some known storage systems, physical storage devices may be self-encrypting drives that encrypt data received from BEs, and then decrypt the data when it is retrieved for BEs. This may be considered a form of data-at-rest encryption. In embodiments of the invention in which data is encrypted on SSI 716, and transmitted to physical storage devices 624 in encrypted form to be stored, it may be desirable that physical storage devices 624 do not employ their own encryption, as the data will arrive encrypted. That is, encrypting the already-encrypted data would be redundant, and a waste of processing resources. Further, self-encrypting drives may be more expensive than drives not including this feature. Thus, if there is no need for physical storage devices 624 to encrypt and decrypt data, physical storage device not having self-encryption, but otherwise having the same or similar capabilities, may be acquired at reduced cost.

By encrypting data on a host system, e.g., as part of an SSI 716, data may not only be able to be encrypted while at rest, but also while in transit. That is, in embodiments of the invention, data may be encrypted in transit on an I/O path from a host system to a physical storage device (i.e., end-to-end) as well as being encrypted at rest on a physical storage device or in memory (e.g., cache) of a storage system.

As described in more detail elsewhere herein, SSI 716 may be implemented in various combinations of hardware, software and firmware, including microcode. In some embodiments of SSI 716 implemented using software and/or firmware, the software and/or firmware, and updates thereto, may be subject to verification of digital signature before being allowed to be installed on SSI 716. For example, the security credentials 714 may include a public certificate that includes a cryptographic key (e.g., a public key of a PKI pair or the like), which may be embedded within the software and/or firmware initially installed on SSI 716 (e.g., at the manufacturer of SSI 716). The public certificate also may specify a validity period for the public certificate. Each subsequent update of the software and/or firmware may be digitally signed with a digital signature based on an encryption scheme (e.g., PKI) involving the public key.

When a purported software and/or firmware update is received at SSI 716 including a digital signature, code validation logic 713 may use the public key (and the validity period) in the public certificate to validate the digital signature and thereby verify the authenticity of the update, for example, by exchanging communications with a certification service or the like of the SSI 716 manufacturer or a trusted third-party, using known techniques. The security credentials 714, including the public certificate and perhaps other credentials, and credentials used for encrypting and decrypting data, may be embedded within the software and/or firmware on the SSI 716 so that they are not accessible by the host system 700 or any other entity connected to the SSI 716. For example, the security credentials 714 may be stored within a trusted platform module (TPM) or the like within SSI 716. If the code validation logic determines the software or firmware update to be invalid, the update may not be installed on SSI 716. Such verification of the software and/or firmware may prevent an attacker from replacing software and/or firmware on SSI 716 with code that would allow access to resources within storage system 620a.

Storage metadata 722 may include any metadata about data stored on storage system 620a, including but not limited to any of the metadata described herein. For example, storage MD 722 may include any of master device table 762, LSU table 772, thin device table 772', track table 782 and cache slot table 750, corresponding to master device table 62, LSU table 72, thin device table 72', track table 82 and cache slot table 500, respectively. For example, each of tables 762, 772, 772', 782 and 750 may include at least a portion of the metadata stored in 762, 772, 772', 782 and 750, respectively; e.g., metadata corresponding to physical storage devices 624, and logical storage devices associated therewith, being used for applications running on host system 700. Use of such metadata is described in more detail elsewhere herein.

I/O processing logic 717 may include one or more components for performing I/O operations in conjunction with storage system 620a. In some embodiments, one or more of these components embody I/O functionality, including data services, that is implemented on known storage systems. By implementing such I/O functionality on SSI 716 instead of on the storage system 620a, less storage system resources may be consumed, and overall I/O performance on the storage system may be improved. I/O processing logic 717 may include any of: device mapping logic 718; I/O path logic 720; integrity logic 721; messaging logic 724; RDMA logic 725; atomic logic 726; back-end logic 728; other components; or any suitable combination of the foregoing.

Device mapping logic 718 may be configured to map logical addresses of logical storage devices to locations (i.e., physical addresses) within physical storage devices using, e.g., any one or more of tables 762, 772, 772' and 782, 750.

Device mapping logic 718 may be configured to determine, from the retrieved metadata, the location(s) within cache 642 and/or within one or more physical storage devices 624 corresponding to the logical location specified in the I/O operation. The I/O operation (e.g., read or write) then may be performed with respect to the determined cache location and/or one or more physical storage device locations. In some embodiments, the device mapping logic 718, in coordination with one or more other components of I/O processing logic 717, SSI 716 and/or host system 700, may perform aspects of I/O operations, including exchanging communications with components of storage system 620a over internal fabric 630, as described in U.S. patent application Ser. No. 16/389,383, titled "Host System Directly Connected to Internal Switching Fabric of Storage System," to Wigmore et al., filed Apr. 19, 2019 ("Wigmore"), the entire contents of which are hereby incorporated by reference.

It should be appreciated that, while in some embodiments described herein, the metadata corresponding to a logical location may be used to determine a corresponding one or more locations in cache and/or a physical storage location, the metadata may include a variety of information other than location information, as described in more detail elsewhere herein, and may be used for any of a variety of other purposes, for example, by one or more components of host system 700 and/or storage system 620a.

I/O path logic 720 may be configured to determine what I/O path within storage system 620a to use to process an I/O operation. I/O path logic 720 may be configured to determine what path to take for an I/O operation based on any of a variety of factors, including but not limited to whether the I/O is a read or write; how complicated a state of the storage system is at the time the I/O operation is being processed; whether the data specified by the I/O operation is in a cache of the storage system; other factors; or a combination of the foregoing. For example, based on one or more of the foregoing factors, I/O path logic 720 may determine whether to process an I/O request by: sending a communication to a director; directly accessing a cache on the storage system (i.e., without using any compute resources of a director) or accessing a physical storage device without using a director (e.g., via an FDI). I/O path logic 720 may be configured to determine what I/O path within storage system 620a to use to process an I/O operation as described in more detail in Wigmore.

Integrity logic 721 may be configured to implement one or more data integrity techniques for I/O operations. Some data storage systems may be configured to implement one or more data integrity techniques to ensure the integrity of data stored on the storage system on behalf of one or more host systems. One such data integrity technique is called DIF (data integrity field), or "T10DIF" in reference to the T10 subcommittee of the International Committee for Information Technology Standards that proposed the technique. Some storage systems, for example, in accordance with one or more technology standards, store data arranged as atomic storage units called "disk sectors" having a length of 512 bytes. T10 DIF adds an additional 8 bytes encoding a checksum of the data represented by the remaining 512 byes, resulting in data actually being stored as 520-byte atomic units, including 512 bytes of data and 8 bytes of checksum data in accordance with T10DIF. In embodiments of the invention in which storage system 620a is implementing T10DIF, integrity logic 721 may be configured to implement T10DIF, thereby converting 512-byte units of data in I/O communications received from host OS 701 to 520-byte units of data in accordance with T10DIF to be transmitted in I/O communications to storage system 620a. In such embodiments, integrity logic 721 also may be configured to convert 520-byte units of data in I/O communications received from storage system 620a to 512-byte units of data to be transmitted in I/O communications to host OS 701. In such embodiments, data integrity on a storage network (e.g., storage network 600) may be improved by implementing T10DIF on an I/O path from a host system to a physical storage device (e.g., end-to-end).

Processing I/O operations in accordance with embodiments of the invention may include exchanging RDMA communications, control (e.g., command) communications and atomic communications between host system 700 and storage system 620a. RDMA logic 725, messaging logic 724, and atomic logic 726, respectively, may be configured to implement such communications. Atomic communications involve performing exclusive locking operations on memory locations (e.g., at which one or more data structures described herein reside) from which data is being accessed, to ensure that no other entity (e.g., a director) can write to the memory location with other data. The exclusive locking operation associated with an atomic operation introduces a certain amount of overhead, which may be undesired in situations in which speed is of greater performance.

It may be desirable for host system 700; e.g., SSI 716, to know information (e.g., a state) of one or more physical storage devices 624, for example, whether a physical storage device is off-line or otherwise unavailable, e.g., because of garbage collection. To this end, in some embodiments, back-end logic 728 may monitor the status of one or more physical storage devices 624, for example, by exchanging communications with FDI 606 over internal fabric 630.

SSCI 729 may include logic for steering and routing I/O communications to one or more ports 731 of SSI 716 physically connected to internal fabric 630, and may include logic implementing lower-level processing (e.g., at the transport, data link and physical layer) of I/O communications, including RDMA, messaging and atomic communications. In some embodiments of the invention, communications between SSI 716 and components of storage system 620a (e.g., directors 637, GM 640 and FDI 606) over internal fabric 630 may be encapsulated as NVMf command capsules in accordance with an NVMf specification. For example, SSCI 729 may include logic for encapsulating I/O communications, including RDMA, messaging and atomic communications, in accordance with NVMf. Thus, in some embodiments, I/O communications received from NVMe driver 702, configured in accordance with NVMe, may be converted to NVMf command capsule communications for transmission over the internal fabric 630. SSCI 729 also may include logic for de-capsulating NVMf command capsules, for example, into NVMe communications to be processed by I/O processing logic 717.

SSCI 729 (and components of the storage system 620a interfacing with the internal fabric 630) may be configured to address communication to other components; e.g., GM 640, FDI 606, directors 637, in accordance with one or more technologies being used to communicate over internal fabric 630. For example, in embodiments in which IB is employed to communicate over internal fabric 630, SSCI 729 may be configured to address communication to other components using IB queue pairs. Aspects of SSCI 729 may be implemented using a network adapter (e.g., card or chip), for example, a ConnectX®-5 or ConnectX®-6 dual-port network adapter available from Mellanox Technologies, Ltd. of Sunnyvale, Calif. ("Mellanox"), for example, as part of a SmartNIC.

SSI 716 may be implemented as a combination of software, firmware and/or hardware. For example, SSI 716 may include certain hardware and/or firmware, including, for example, any combination of printed circuit board (PCB), FPGA, ASIC, or the like, that are hardwired to perform certain functionality, and may include one or more microprocessors, microcontrollers or the like that are programmable using software and/or firmware (e.g., microcode). Any suitable microprocessor may be used, for example, a microprocessor including a complex instruction set computing (CISC) architecture, e.g., an x86 processor, or processor having a reduced instruction set computing (RISC) architecture, for example, an ARM processor. SSI 716 may be part of a microprocessor or separate therefrom. In embodiments in which a microprocessor is employed, any suitable OS may be used to operate the microprocessor, including, for example, a Linux operating system. In some embodiments, the combination of software, hardware and/or firmware may constitute a system-on-chip (SOC) or system-on-module (SOM) on which SSI 716 may be implemented, e.g., as part of a SmartNIC. For example, in some embodiments, SSI 716 may be implemented, at least in part, using a BlueField™ Multicore System On a Chip (SOC) for NVMe storage, available from Mellanox, which may be further configured with logic and functionality described herein to constitute a SmartNIC.

Returning to FIG. 6, FDI 606 and one or more of physical storage devices 624 may be configured to exchange I/O communications in accordance with NVMe. Accordingly, FDI 606 may include an NVMe controller, e.g., at least similar to the NVMe controller 708, configured to exchange I/O communication according to NVMe with physical storage devices 624. Further, FDI 606 may be configured with the same or similar functionality as SSCI 729. For example, SSCI 729 may include: logic for steering and routing I/O communications to one or more of its ports physically connected to internal fabric 630, logic implementing lower-level processing (e.g., at the transport, data link and physical layer) of I/O communications, including RDMA and messaging communications; logic for encapsulating I/O communications to be sent from FDI 606 over internal fabric 630 to SSI 616, including RDMA and command messaging communications, in accordance with NVMf; logic for de-capsulating NVMf command capsules received from internal fabric 630, the decapsulated communication to be configured in accordance with NVMe for use by an NVMe controller of the FDI 606 for exchanging I/O communications with physical storage devices 624.

FDI 606 may be implemented as a combination of software, firmware and/or hardware including, for example, any combination of printed circuit board (PCB), FPGA, ASIC, or the like, that are hardwired to perform certain functionality, and may include one or more microprocessors, microcontrollers or the like that are programmable using software and/or firmware (e.g., microcode). Any suitable microprocessor may be used, for example, a microprocessor including a complex instruction set computing (CISC) architecture, e.g., an x86 processor, or processor having a reduced instruction set computing (RISC) architecture, for example, an ARM processor. In some embodiments, the combination of software, hardware and/or firmware may constitute a system-on-chip (SOC) or system-on-module (SOM) on which FDI 606 may be implemented. For example, in some embodiments, FDI 606 may be implemented using a BlueField™ Multicore SOC for NVMe storage, available from Mellanox.

The host system 700 and/or the data storage network 600 may be used to maintain host cache coherency on one or more host systems, for example, as will now be described.

Figure 8:
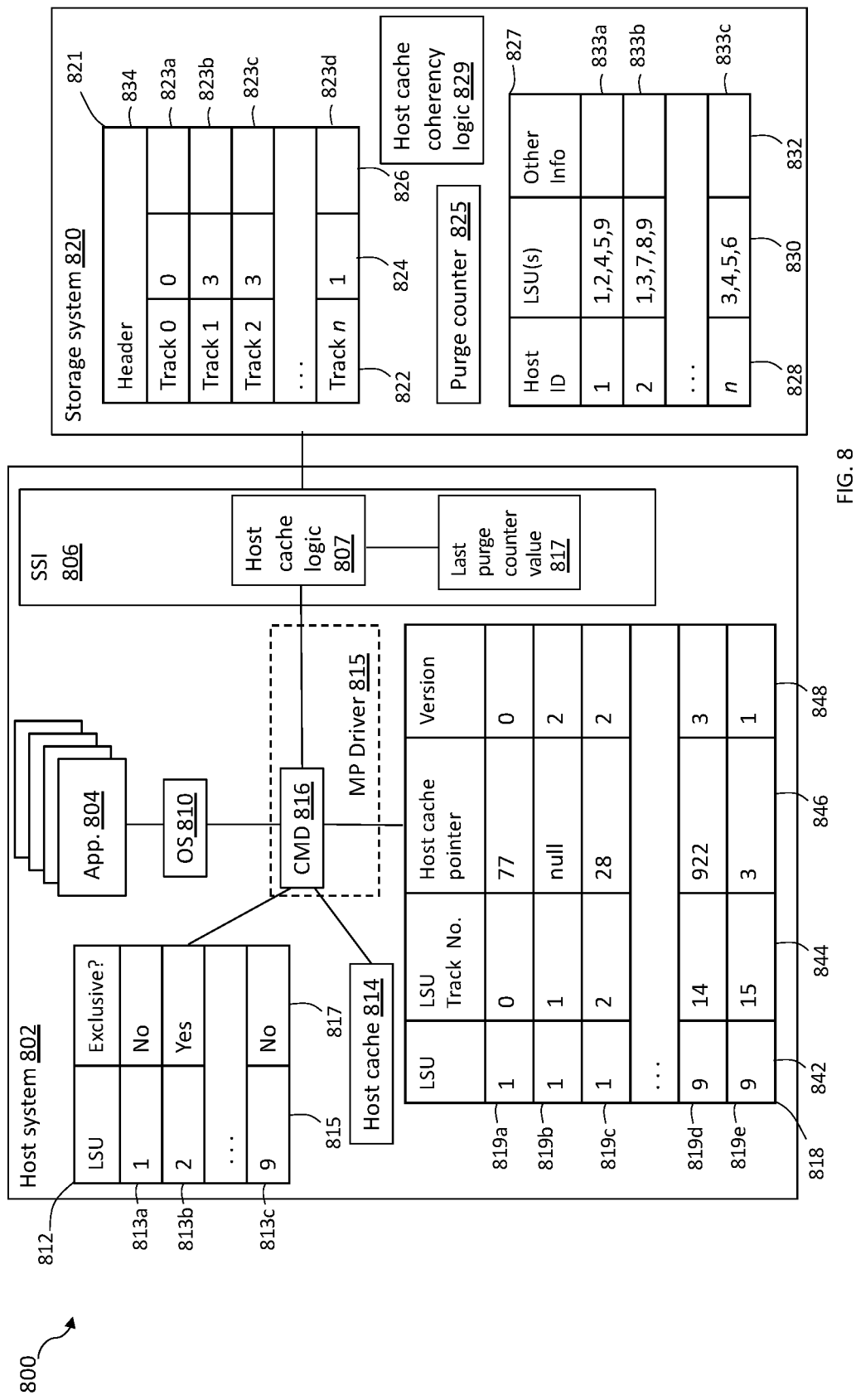
FIG. 8 is a block diagram illustrating an example of a system for maintaining host cache coherency, according to embodiments of the invention.

FIG. 8 is a block diagram illustrating an example of a system 800 for maintaining host cache coherency, according to embodiments of the invention. Other embodiments of a system for maintaining host cache coherency, for example, variations of system 800, are possible and are intended to fall within the scope of the invention. The system 800 may be implemented using one or more components of the data storage network 600 and/or the host system 700. For example, the system 800 may include a host system 802, which may include one or more components of the host system 700, and may include a storage system 820, which may include one or more components of the storage system 620a.

The host system 802 may include any of: an exclusivity table 812; one or more applications 804; an operating system 810; a host cache 814; a CMD 816, which may be part of an MP driver 815; a host cache slot table 818; an SSI 806; other components; or any suitable combination of the foregoing. The one or more applications 804 may be any type of application, and may be executed by the OS 816, resulting in data being written to and read from the storage system 820 through the SSI 806.

The host cache 814 may include a plurality of cache slots (not shown), each cache slot including data for one or more data portions (e.g., tracks) of an LSU stored on the storage system 820. The data portions may have been placed in the host cache 814 (e.g., by the CMD 816) as a result of a previous read of the data from the storage system, or as a result of a write of the data portion to the storage system 820 in some embodiments. For each data portion stored in the host cache 814, an entry may be maintained in the host cache slot table 818.

The host cache slot table 818 may include any of the information described herein in relation to the host cache slot table 500. Host cache slot table 818 may include a plurality of entries (i.e., rows) 819a-e, each row representing an LSU track (e.g., any of LSU tracks 823a-d in LSU track table 821) identified by an LSU ID (e.g., number) in column 842 and an LSU track ID (e.g., number) identified in column 844. For each entry of cache slot table 818, column 846 may specify a host cache location in host cache 814 corresponding to the LSU track specified by columns 842 and 844. A combination of an LSU identifier and LSU track identifier may be used to determine from columns 842 and 844 whether the data of the identified LSU track currently resides in any host cache slot identified in column 846. Through use of information from host cache slot table 818 as described herein, the one or more LSU tracks of an LSU specified in an I/O operation can be mapped to one or more cache slots of the host cache 814.

In some embodiments, the host cache slot table 818 also may include a version column 848 that specifies a version ID (e.g., number) of the data portion stored in the host cache 814. This version ID may be used, for example, in response to a read request, to determine whether the data portion is a latest version of the data portion stored on the storage system, e.g., by comparison to a version number stored in LSU track table 821, as described in more detail elsewhere herein. Such determination may be made in response to a read request as part of determining whether to retrieve data from host cache 814 or from a physical storage device or cache of the storage system 820, as described in more detail elsewhere herein.

The exclusivity table 812 may include a plurality of entries 813a-813c, where each entry may specify an LSU ID in LSU ID column 815 and a value indicating whether the LSU is: exclusive to the host system 802 (e.g., value="yes", "1" or some other predefined Boolean value); or shared with one or more other host systems (e.g., value="no", "0" or some other predefined Boolean value). This value may be accessed in response to a read request as part of determining whether to retrieve data from host cache 814 or from a physical storage device or cache of the storage system 820, as described in more detail elsewhere herein.

The CMD 816 may be configured (e.g., in hardware, firmware or software, or a combination thereof) to perform one or more steps, functions or actions described herein as being performed by a host system as part of maintaining host cache coherency. The CMD 816 may be part of the MP driver 815, which may be implemented, at least in part, as the MP driver 106 described in more detail elsewhere herein.

The SSI 806 may be configured to include any of the functionality and/or components of the SSI 716 described in more detail elsewhere herein. The SSI 806 may include host cache logic 807 that may be configured (e.g., in hardware, firmware or software, or a combination thereof) to perform one or more steps, functions or actions described herein as being performed by a host system (in particular by an SSI) as part of maintaining host cache coherency. For example, the host cache logic 807 may be configured to periodically (e.g., once per second) poll a purge counter 825 of the storage system, access a last purge counter value 817, and compare the two values as part of determining whether to purge one or more entries from the host cache 814, e.g., in response to a non-I/O modification instruction, as described in more detail elsewhere herein.

The storage system may include any of: one or more LSU track tables 821; host registration table 827; purge counter 825; host cache coherency logic 829; any component of data storage systems 620a and/or 20a; other components; or any suitable combination of the foregoing. For each LSU having data stored on the storage system 820, the storage system 820 may include an LSU track table for each logical data portion of the LSU.

For a given logical data portion of an LSU, the LSU track table 821 may include any of the information described in relation to LSU track table 82. The LSU track table 821 may include a header 834. The LSU track table 821 also may include entries 823a-d, each entry representing an LSU track of the represented logical data portion of the LSU. In an embodiment, there may be fifteen tracks for each contiguous logical data portion of an LSU. However, for other embodiments, it may be possible to have different numbers of tracks for each of the logical data portions or even a variable number of tracks for each logical data portion. The information in each of the LSU track entries 823a-d may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 823a-d may include a pointer (either direct or indirect—e.g., through another data structure) to one or more cache slots of a cache in the GM (e.g., the cache 642 of the GM 640) if the data of the logical track is currently in cache. For example, an LSU track entry 823a-d may point to one or more entries of cache slot table 500, described in more detail elsewhere herein. Thus, the LSU track table 821 may be used to map logical addresses of an LSU corresponding to the tables 762, 772 and 821 to physical addresses within physical storage devices of a storage system and/or to cache slots within a cache.

In some embodiments, each entry 823a-d may specify a version ID of the data stored on the represented track. For example, each entry 823a-d may specify a track ID of a track in column 822 and a version ID of the data of the track in column 824, as well as other information about the track in the column 826. The data version ID (e.g., number) may be updated (e.g., incremented) each time data is written by a host to the specified track, or data is restored to the track (e.g., as part of snap restore or backup restore), and may represent a latest version of the track data on the storage system. This version ID of the latest version may be used, for example, in response to a read request, to determine whether a data portion stored in a cache slot of a host cache is a latest version of the data portion stored on the storage system, e.g., by comparison of the version ID specified in the version ID column 824 of an entry to a version number specified in the version ID column 848 of an entry 819a-e of the cache slot header table 818, as described in more detail elsewhere herein. Such determination may be made in response to a read request as part of determining whether to retrieve data from host cache 814 or from a physical storage device or cache of the storage system 820, as described in more detail elsewhere herein.

The host registration table 827 may specify information about host systems that have registered with the storage system, for example, as described in U.S. Pat. No. 8,904, 050, titled "Techniques for Automated Data Storage System Port Initialization" to Raizen et al, issued Dec. 2, 2018, the entire contents of which are hereby incorporated by reference.

The host registration table 827 may include a plurality of entries 833a-c, each entry representing a host. Each entry 833a-c may include a host ID of the represented host in host ID column 828, the LSU IDs of the one or more LSUs of the host that are active on the storage system in LSU column 830 and other information about the host in other information column 832. The host registration table 827 may be accessed for any of a variety of reasons, including to determine, for a host system, which LSUs are exclusive to the host system, and which LSUs are shared by other host systems, for example, when populating an exclusivity table (e.g., the exclusivity table 812).

The host cache coherency logic 829 may be configured (e.g., in hardware, firmware or software, or a combination thereof) to perform one or more steps, functions or actions described herein as being performed by a storage system as part of maintaining host cache coherency. The host cache coherency logic 829 may be implemented, at least in part, as part of a director (e.g., one of the directors 637) and/or as part of a management module (e.g., the management module 22).

Methods of maintaining host cache coherency in accordance with embodiments of the invention, for example, using the various systems and data structures describe in relation to FIGS. 1-8, will now be described.

FIG. 9 is a flow chart illustrating an example of a method 900 of maintaining host cache coherency when modifying data on a storage system, according to embodiments of the invention. Other embodiments of a method for maintaining host cache coherency when modifying data on a storage system, for example, variations of method 900, are possible and are intended to fall within the scope of the invention.

In a step 902, a storage system may receive a non-I/O instruction to modify data, for example, a snap restore instruction or a back-up restore instruction. In response to the step 902, in a step 904, one or more purge counters may be incremented. A single purge counter (e.g., the purge counter 825) may be maintained for the storage system and incremented in step 904, or separate purge counters may be maintained for multiple LSUs, and a purge counter for an LSU incremented only if the non-I/O modification instruction affects the LSU.

In some embodiments, before executing the non-I/O modification instruction, the storage system may wait until it receives an acknowledgements from each host system having an LSU affected by the non-I/O modification instruction, the acknowledgement indicating that any host cache entries on the host system a data portion of an affected LSU have been purged. For example, the storage system may wait until steps 906-912 have been performed for each such host system before performing a step 916 of executing the non-I/O modification instruction.

In a step 906, the storage system may receive a purge count inquiry from a host system. For example, a host system implementing host caching may periodically poll the storage system to determine the purge counter value. In a step 908, the storage system may provide the current purge count value to the inquiring host system. Each inquiring host system may record the current purge counter value (e.g., as the last purge counter value 817), and then compare it to a next purge counter value determined during a next polling. When the current value of the purge counter value is different than a previous purge counter value, the host system may purge from its host cache any data portions for LSUs associated with the purge counter (e.g., any LSU for which data is stored on the data storage system) in a step 910. The purging in step 910 may be performed in accordance with method 1000 described in connection with FIG. 10.

It should be appreciated that in most cases in which the host system polls the value of the purge counter 825, the last purge counter value 817 and the current value of the purge counter 825 will match, and a purging will not be necessary. However, in the context of the method 900 in which a purge counter is incremented in the step 904, a next polling of the purge counter 25 following such incrementing should result in a non-match of counter values and a purging of any data entries in the host cache 814 of LSUs affected by the non-I/O modification.

It also should be appreciated that, in some embodiments, a flag or bit could be used by the storage system instead of a counter. However, in the event that a host system is inactive during a time in which the flag was set, and then activated again after the flag had been cleared, the host system would be unaware that the data in its host cache is potentially incorrect; i.e., out-of-sync with the data on the storage system. For this reason, a counter may be preferred.

Further, in some embodiments, the number of digits used for the counter is made large enough (e.g., 64K) to ensure that the counter does not cycle through all the potential values (and restart at the beginning) while a host system is inactive, so that there is no possibility (or at least a highly unlikely possibility) that the host system may have a last purge counter value that is the same as the current purge counter value, but from a previous cycling through of the potential purge counter values.

An embodiment of the purging of one or more cache entries in the step 910 will now be described in relation to FIG. 10. FIG. 10 is a flow chart illustrating an example of a method 1000 of a host system purging one or more host cache entries, according to embodiments of the invention. Other embodiments of a method of a host system purging one or more host cache entries, for example, variations of method 1000, are possible and are intended to fall within the scope of the invention. For example, the method 1000 will be described with reference to FIG. 8, but is not limited to this illustrative embodiment.

The CMD 816 may control purging any entries from the host cache 814 for data portions of LSUs affected by a non-I/O modification on the storage system 820. Further, entries in the host cache slot table 818 corresponding to these data portions may be cleared or purged.

In a step 1002, an SSI (e.g., the SSI 806) may notify a CMD (e.g., the CMD 816) that the purge counter (e.g., the purge counter 825) has been incremented, e.g., as determined by a comparison to a last purge counter value (e.g., the last purge counter value 817). In a step 1004, the CMD may control a purging of one of more cache entries from cache. In step 1006, after receiving acknowledgement from the host cache the appropriate entries have been purged, the CMD may acknowledge that purging has been complete to the SSI, which then may send a corresponding acknowledgement to the storage system in the step 912 of the method 900.

Returning to FIG. 9, in a step 912, the host system may send an acknowledgement (e.g., from the SSI 806 over directly attached internal fabric) to the host cache logic 829 on the storage system 820) that purging is complete; i.e., that the host system has purged any entries in its host cache corresponding to LSUs on the storage system affected by the non-I/O modification.

In a step 914, the storage system may determine whether there are any more hosts having LSUs affected by the non-I/O modification (e.g., having any LSU on the storage system). The storage system may determine which host systems have active LSUs on the storage system by accessing the host registration table 827. If it is determined in the step 914 that there are no more such host systems, then method 1000 may proceed to the step 916 of executing the non-I/O modification instruction. If it is determined that there are such host systems from which an acknowledgement has not been received, then the storage system may continue to wait for a next host system, as illustrated by the looping back of the method 1000 to a point prior to the act 906.

Figure 11:
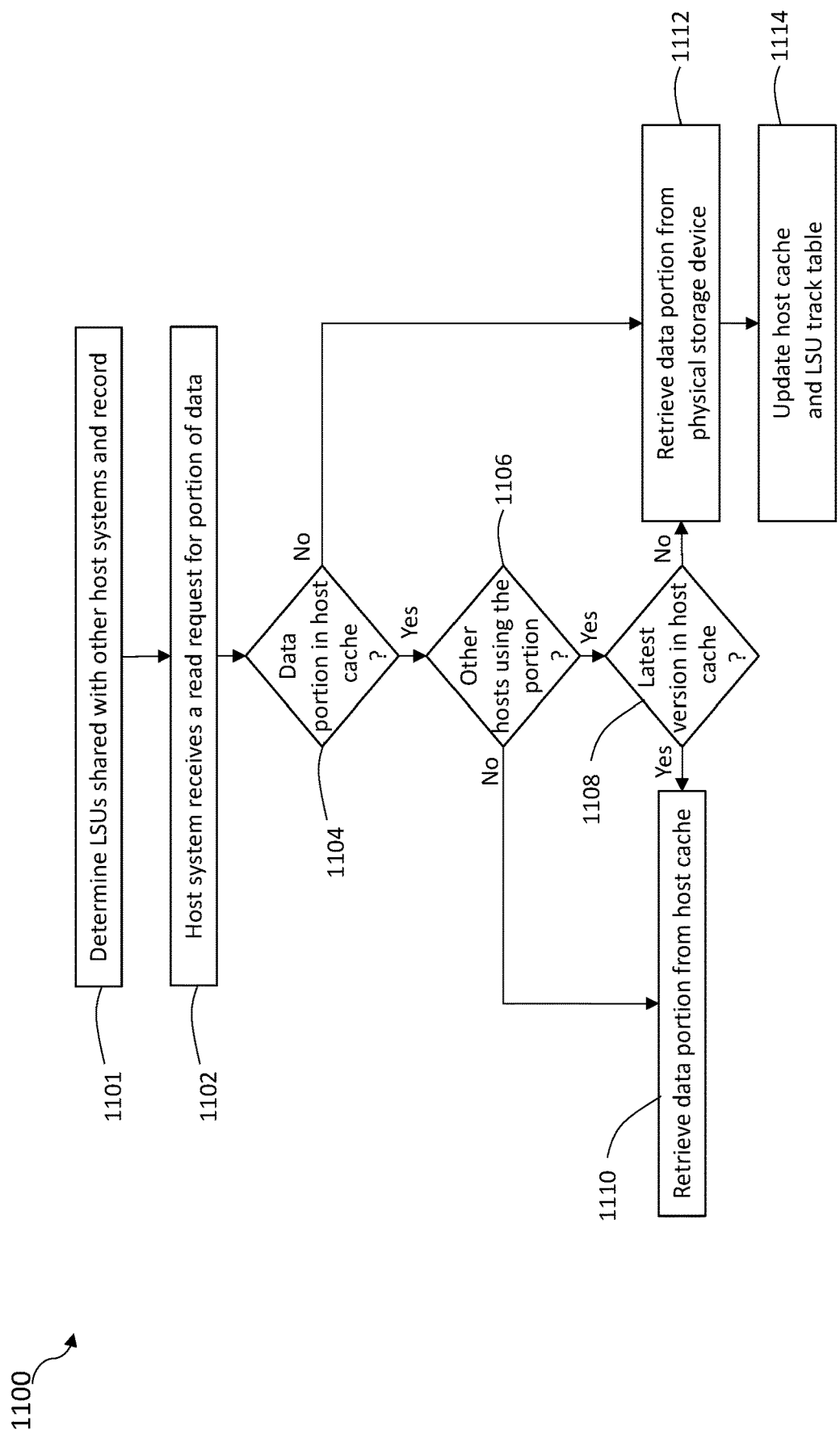
FIG. 11 is a flow chart illustrating an example of a method of maintaining host cache coherency when reading data, according to embodiments of the invention.

FIG. 11 is a flow chart illustrating an example of a method 1100 of maintaining host cache coherency when reading data, according to embodiments of the invention. Other embodiments of a method for maintaining host cache coherency when reading data, for example, variations of method 1100, are possible and are intended to fall within the scope of the invention.

In a step 1101, a host system (e.g., the host system 802) may determine, for each LSU for which an application executes on the host system, whether the LSU is shared by one or more other host systems, and the results of this determination may be recorded, for example, in a host exclusivity table (e.g., the host exclusivity table 812). For example, with reference to FIG. 8, the host system 802 (e.g., the CMD 816 and/or the host cache logic 807) may exchange communications with storage system (e.g., directly over the internal fabric) to determine which LSUs on the host system are shared with other host systems. In some embodiments, the host system may directly access the host registration table 827 (e.g., in GM) to make such determination. For example, the host system 802 may determine from entries 833*a* and 833*b* of the host registration table 827 that LSUs 1 and 9 are shared by Host 2, and that LSU 2 is not shared by another host, and these results may be stored in entries 813*a-c* of the exclusivity table 812.

In a step 1102, a host system may receive a read request for a data portion from an application executing on the host. In a step 1104, the host system may determine whether the data portion is in a host cache (e.g., the host cache 814), for example, by accessing one or more data structures including, e.g., the host cache slot table 818. For example, with reference to FIG. 8, if a request is received for a Track 0 of LSU 1, it may be determined from the entry 819*a* of the host cache slot table 818 that this data portion is in cache slot 77 of the host cache 814. If a request is received for a Track 1 of LSU 1, it may be determined from the entry 819*b* of the host cache slot table 818 that this data portion is not in the host cache 814.

If it is determined in the step 1104 that the data portion is in host cache (e.g., for Track 0 of LSU 1), it may be determined in a step 1106 whether the LSU of the data portion is shared (i.e., used) by one or more other host systems, for example, by accessing an exclusivity table. For example, with reference to FIG. 8, if a request is received for a track of LSU 1, it may be determined from the entry 813*a* of the exclusivity table 812 that LSU 1 is shared by another host table, and if a request is received for a track of LSU 2, it may be determined from the entry 813*b* of the exclusivity table 812 that LSU 2 is not shared by another host table; i.e., LSU 2 is exclusive to the host system 802.

If it determined in the step 1106 that there is at least one other host system sharing the LSU of the requested data portion, then it may be determined in a step 1108 whether a latest version of the data portion is stored in the host cache. For example, a latest version stored on the storage system may be determined and compared to the version stored in the host cache, e.g., by the host system exchanging communications with the storage system (e.g., directly over an internal fabric) to determine the latest version number of the data portion stored on the storage system. This latest version may be compared to the version number for the data portion stored on the host system to determine if the latest version of the data portion is in the host cache For example, with reference to FIG. 8, if the requested data portion is Track 0 of LSU 1, the host system 802 may communication directly with one or more device tables, including the LSU track table 821, to determine from the version column 824 of the entry 823*a* that the latest version of LSU 1, Track 0 is 0. The host system 802 also may determine from accessing the entry 819*a* in the host cache slot table 818 that the version of LSU 1, Track 0 in host cache 814 is 0. Accordingly, the result of the step 1108 in this example would be that the latest version of the requested data portion is in the host cache 814.

As another example, if the requested data portion is Track 2 of LSU 1, the host system 802 may communication directly with one or more device tables, including the LSU track table 821, to determine from the version column 824 of the entry 823*c* that the latest version of LSU 1, Track 2 is 3. The host system 802 also may determine from accessing the entry 819*c* of the host cache slot table 818 that the version of LSU 1, Track 0 in host cache 814 is 2. Accordingly, the result of the step 1108 in this example would be that the latest version of the requested data portion is not in the host cache 814.

If it is determined in the step 1106 that there are no other host systems sharing the LSU (e.g., LSU 2 on the host system 802) or if it is determined in the step 1108 that the version in the host cache is the latest version stored on the storage system (e.g., LSU 1, track 0 on the host system 802), the data portion may be retrieved from the host cache.

If it is determined in the step 1104 that the data portion is not stored in the host cache (e.g., LSU 1, Track 1 on the host system 802), or if it is determined in the step 1108 that the version in the host cache is not the latest version stored on the storage system (e.g., LSU 1, Track 2 on the host system 802), the data portion may be retrieved from the storage system, and the host cache may be updated with the latest version of the data portion.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 900, 1000 and 1100, or parts thereof, may be implemented using one or more of the systems and/or data structures described in relation to FIGS. 1-8, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage network including a data storage system and one or more host systems having applications executing thereon, the execution of which results in data being stored on one or more physical storage devices of the data storage system, a method comprising:
    on a first of the one or more host systems, maintaining a cache including a plurality of entries, wherein a first of the plurality of entries represents a first portion of data that is stored on a first of the one or more physical storage devices, and the first entry specifies a particular version of the first portion of data;
    receiving a read request on the first host system from a first of the one or more applications, wherein the read request is a request to read the first portion of data stored at a logical address on a logical storage unit configured on the data storage system, wherein the first entry of the cache is associated with the logical address on the logical storage unit and indicates that the particular version of the first portion of data of the first entry is stored at the logical address on the logical storage unit; and
    responsive to receiving the read request, the first host system performing processing including:
        determining whether the cache of the first host system includes the first portion of data stored at the logical address on the logical storage unit; and
        responsive to determining that the cache of the first host includes the first portion of data stored at the logical address on the logical storage unit, performing first processing including:
            determining whether the logical storage unit including the first portion of data is shared by the first host system with at least a second of the one or more host systems or whether the logical storage unit is used exclusively by the first host system; and
            if it is determined that the logical storage unit including the first portion of data is shared by the first host system with at least the second of the one or more host systems and thereby not used exclusively by the first host system, performing second processing including:
                determining if the particular version specified by the first entry is a latest version of the first portion of data, wherein said determining if the particular version specified by the first entry is a latest version includes sending a communication from the first host system to the data storage system; and
                if it is determined that the particular version is the latest version of the first portion of data, retrieving the first portion of data from the first entry to satisfy the read request.

2. The method of claim 1, wherein the first processing further comprises:
    if it is determined that the logical storage unit including the first portion of data is used by used exclusively by the first host system and thereby not shared by the first host system with at least the second of the one or more host systems, retrieving the first portion of data from the first entry of the cache to satisfy the read request.

3. The method of claim 1, further comprising:
    storing on the first host system a first value indicating whether the logical storage unit is shared by the first host system with at least the second of the one or more storage systems or whether the logical storage unit is used exclusively by the first host system,
    wherein said determining whether the logical storage unit including the first portion of data is shared by the first host system with at least the second of the one or more storage systems or whether the logical storage unit is used exclusively by the first host system further includes accessing the first value on the first host system.

4. The method of claim 1, wherein said second processing further comprises:
    if it is determined that the particular version is not the latest version of the first portion of data, retrieving the first portion of data from the first physical storage device.

5. The method of claim 1, wherein each entry of the cache represents a portion of data, and specifies an associated logical storage unit and an associated version of the respective portion.

6. The method of claim 1, wherein the first host system is directly connected to an internal fabric of the data storage system without an intervening component of the storage system controlling access of the at least first host system to the internal fabric, and
    wherein the communication is sent directly to the internal fabric without going through any intervening component of the storage system.

7. The method of claim 6, wherein the communication is a remote direct memory access communication to a global memory of the storage system that does not require use of any central processing unit resources of the storage system.

8. The method of claim 6, wherein the first host system and the data storage system are separate physical systems, wherein the first host system includes a storage system interface that is directly connected, over at least one direct connection from a port of the storage system interface, to the internal fabric of the data storage system, wherein the data storage system includes the internal fabric that is internal within the data storage system and that is used for internal communications between components of the data storage system, wherein the components of the data storage system include a memory that is connected to the internal fabric, one or more directors, and the one or more physical devices of the data storage system.

9. A first host system of a data storage network including a data storage system and one or more host systems having applications executing thereon, including the first host system, the execution of which results in data being stored on one or more physical storage devices of the data storage system, the first host system comprising:
one or more processors; and
a memory comprising code stored thereon that, when executed, performs a method comprising:
maintaining a cache including a plurality of entries, wherein a first of the plurality of entries represents a first portion of data that is stored on a first of the one or more physical storage devices, and the first entry specifies a particular version of the first portion of data;
receiving a read request on the first host system from a first of the one or more applications, wherein the read request is a request to read the first portion of data stored at a logical address on a logical storage unit configured on the data storage system, wherein the first entry of the cache is associated with the logical address on the logical storage unit and indicates that the particular version of the first portion of data of the first entry is stored at the logical address on the logical storage unit; and
responsive to receiving the read request, the first host system performing processing including:
determining whether the cache of the first host system includes the first portion of data stored at the logical address on the logical storage unit; and
responsive to determining that the cache of the first host includes the first portion of data stored at the logical address on the logical storage unit, performing first processing including:
determining whether the logical storage unit including the first portion of data is shared by the first host system with at least a second of the one or more host systems or whether the logical storage unit is used exclusively by the first host system; and
if it is determined that the logical storage unit including the first portion of data is shared by the first host system with at least the second of the one or more host systems and thereby not used exclusively by the first host system, performing second processing including:
determining if the particular version specified by the first entry is a latest version of the first portion of data, wherein said determining if the particular version specified by the first entry is a latest version includes sending a communication from the first host system to the data storage system; and
if it is determined that the particular version is the latest version of the first portion of data, retrieving the first portion of data from the first entry to satisfy the read request.

10. The first host system of claim 9, wherein the first processing further comprises:
if it is determined that the logical storage unit including the first portion of data is used by used exclusively by the first host system and thereby not shared by the first host system with at least the second of the one or more host systems, retrieving the first portion of data from the first entry of the cache to satisfy the read request.

11. The first host system of claim 9, wherein the method further comprises:
storing on the first host system a first value indicating whether the logical storage unit is shared by the first host system with at least the second of the one or more storage systems or whether the logical storage unit is used exclusively by the first host system,
wherein said determining whether the logical storage unit including the first portion of data is shared by the first host system with at least the second of the one or more storage systems or whether the logical storage unit is used exclusively by the first host system further includes accessing the first value on the first host system.

12. The first host system of claim 9, wherein said second processing further comprises:
if it is determined that the particular version is not the latest version of the first portion of data, retrieving the first portion of data from the first physical storage device.

13. The first host system of claim 9, wherein each entry of the cache represents a portion of data, and specifies an associated logical storage unit and an associated version of the respective portion.

14. The first host system of claim 9, wherein the first host system is directly connected to an internal fabric of the data storage system without an intervening component of the storage system controlling access of the at least first host system to the internal fabric, and
wherein the communication is sent directly to the internal fabric without going through any intervening component of the storage system.

15. One or more non-transitory computer-readable media having software stored thereon for a data storage network including a data storage system and one or more host systems having applications executing thereon, the execution of which results in data being stored on one or more physical storage devices of the data storage system, the software comprising:
executable code that, on a first of the one or more host systems, maintains a cache including a plurality of entries, wherein a first of the plurality of entries represents a first portion of data that is stored on a first of the one or more physical storage devices, and the first entry specifies a particular version of the first portion of data;
executable code that receives a read request on the first host system from a first of the one or more applications, wherein the read request is a request to read the first portion of data stored at a logical address on a logical storage unit configured on the data storage system, wherein the first entry of the cache is associated with the logical address on the logical storage unit and indicates that the particular version of the first portion of data of the first entry is stored at the logical address on the logical storage unit; and
executable code that, responsive to receiving the read request, causes the first host system to perform processing including:
determining whether the cache of the first host system includes the first portion of data stored at the logical address on the logical storage unit; and
responsive to determining that the cache of the first host includes the first portion of data stored at the logical address on the logical storage unit, performing first processing including:
determining whether the logical storage unit including the first portion of data is shared by the first host system with at least a second of the one or more host systems or whether the logical storage unit is used exclusively by the first host system; and if it is determined that the logical storage unit including the first portion of data is shared by the first host system with at least the second of the one or more host systems and thereby not used exclusively by the first host system, performing second processing including:

determining if the particular version specified by the first entry is a latest version of the first portion of data, wherein said determining if the particular version specified by the first entry is a latest version includes sending a communication from the first host system to the data storage system; and if it is determined that the particular version is the latest version of the first portion of data, retrieving the first portion of data from the first entry to satisfy the read request.

16. The one or more non-transitory computer-readable media of claim 15, wherein the first processing further comprises:

if it is determined that the logical storage unit including the first portion of data is used exclusively by the first host system and thereby not shared by the first host system with at least the second of the one or more host systems, retrieving the first portion of data from the first entry of the cache to satisfy the read request.

17. The one or more non-transitory computer-readable media of claim 15, wherein the software further comprises:

executable code that controls storing on the first host system a first value indicating whether the logical storage unit is shared by the first host system with at least the second of the one or more storage systems or whether the logical storage unit is used exclusively by the first host system, wherein said determining whether the logical storage unit including the first portion of data is shared by the first host system with at least the second of the one or more storage systems or whether the logical storage unit is used exclusively by the first host system further includes accessing the first value on the first host system.

18. The one or more non-transitory computer-readable media of claim 15, wherein said second processing further comprises:

if it is determined that the particular version is not the latest version of the first portion of data, retrieving the first portion of data from the first physical storage device.

19. The one or more non-transitory computer-readable media of claim 15, wherein each entry of the cache represents a portion of data, and specifies an associated logical storage unit and an associated version of the respective portion.

20. The system of claim 14, wherein the communication is a remote direct memory access communication to a global memory of the storage system that does not require use of any central processing unit resources of the storage system.

21. The one or more non-transitory computer-readable media of claim 15, wherein the first host system is directly connected to an internal fabric of the data storage system without an intervening component of the storage system controlling access of the at least first host system to the internal fabric, wherein the communication is sent directly to the internal fabric without going through any intervening component of the storage system, and wherein the communication is a remote direct memory access communication to a global memory of the storage system that does not require use of any central processing unit resources of the storage system.

* * * * *